(12) United States Patent
Mascarenhas

(10) Patent No.: US 8,010,400 B2
(45) Date of Patent: *Aug. 30, 2011

(54) SYSTEM AND METHOD FOR USING PSYCHOLOGICAL SIGNIFICANCE PATTERN INFORMATION FOR MATCHING WITH TARGET INFORMATION

(75) Inventor: Desmond Mascarenhas, Los Altos Hills, CA (US)

(73) Assignee: Protigen, Inc., Sunnyvale, CA (US)

( * ) Notice: Subject to any disclaimer, the term of this patent is extended or adjusted under 35 U.S.C. 154(b) by 1294 days.

This patent is subject to a terminal disclaimer.

(21) Appl. No.: 11/580,665

(22) Filed: Oct. 13, 2006

(65) Prior Publication Data

US 2007/0033084 A1 Feb. 8, 2007

Related U.S. Application Data

(63) Continuation-in-part of application No. 09/899,348, filed on Jul. 5, 2001, now Pat. No. 7,162,432.

(60) Provisional application No. 60/216,469, filed on Jul. 6, 2000.

(51) Int. Cl.
*G06F 9/46* (2006.01)
(52) U.S. Cl. .................................................... 705/7.29
(58) Field of Classification Search .................... 705/10, 705/7
See application file for complete search history.

(56) References Cited

U.S. PATENT DOCUMENTS

| | | | | |
|---|---|---|---|---|
| 5,710,884 A | * | 1/1998 | Dedrick | 709/217 |
| 5,754,938 A | | 5/1998 | Herz et al. | |
| 5,835,087 A | | 11/1998 | Herz et al. | |
| 5,848,396 A | * | 12/1998 | Gerace | 705/7.33 |
| 6,341,267 B1 | | 1/2002 | Taub | |
| 6,460,036 B1 | | 10/2002 | Herz | |
| 2006/0031114 A1 | | 2/2006 | Zommers | |

OTHER PUBLICATIONS

Ben-Dor, A. et al (1999). "Clustering Gene Expression Patterns," *Journal of Computational Biology* 6(3/4):281-297.
Brown, P. M. S. et al. (Jan. 2000). "Knowledge-Based Analysis of Microarray Gene Expression Data by Using Support Vector Machines," *Proceedings of the National Academy of Sciences of the United States of America* 97(1):262-267.
Costa, J. A. F. et al. (Jun. 1999). "Estimating the Number of Clusters in Multivariate Data by Self-Organizing Maps," *International Journal of Neural Systems* 9(3):195-202.
Eisen, M. B. et al (Dec. 1998). "Cluster Analysis and Display of Genome-Wide Expression Patterns," *Proceedings of the National Academy of Sciences of the United States of America* 95:14863-14868.

(Continued)

*Primary Examiner* — Romain Jeanty
(74) *Attorney, Agent, or Firm* — Morrison & Foerster LLP

(57) ABSTRACT

A computer-implemented system for creating a classification significance pattern for end users, and enabling end users to use their classification significance pattern to conduct custom searches for target information, such as information about products, services, and jobs, as well as enabling third parties, such as vendors and potential employers, to target their advertisements to groups of users meeting a certain classification. A classification significance pattern is created by having a user take a psychological test, for example, that includes a personality test, a design taste test, a recreation/travel test, a life satisfaction test, an interactive game module, or a career/job test, and having the system automatically score such test and classifying the user based on a defined abstract classification.

30 Claims, 9 Drawing Sheets

OTHER PUBLICATIONS

Greenberg, H. M. et al. (1996). "Finding the Right Agent Can Stop the Revolving Door," *Best's Review /Property-Casualty Edition* 97:44-48.

Greller, L D. et al. (1999). "Detecting Selective Expression of Genes and Proteins," *Genome Research* 9:282-296.

Heyer, L. J. et al. (1999). "Exploring Expression Data: Identification and Analysis of Coexpressed Genes," *Genome Research* 9:1106-1115.

Johnson, D. E. (1998). *Applied Multivariate Methods for Data Analysts*. Crockett, C. et al. eds., Brooks/Cole Publishing Company: Pacific Grove, CA, p. 567 (Index).

Keller, G. et al. (Feb. 1999). "Human Embryonic Stem Cells: The Future is Now," Nature Medicine 5(2):151-152.

Robinson, J. P. et al. eds. (1991). *Measures of Personality and Social Psychological Attitudes*. Academic Press, Inc.: San Diego, CA, p. 753.

Romesburg, H. C. (1984), "Basics-The Six Steps of Cluster Analysis" Chapter 2 *In Cluster Analysis for Researchers. Lifetime Learning Publications*; Belmont, CA, pp. 9-23.

Sharma, S. (1996). *Applied Multivariate Techniques*. Kent, J. et al. eds. John Wiley & Sons, Inc.: New York, 10 pages (Table of Contents).

Tamayo, P. et al. (Mar. 1999). "Interpreting Patterns of Gene Expression with Self-Organizing Maps: Methods and Application to Hematopoietic Differentiation," *Proceedings of the National Academy of Sciences of the United States of America* 96:2907-2912.

Toronen, P. et al. (1999). "Analysis of Gene Expression Data Using Self-Organizing Maps," *FEBS Letters* 451:142-146.

Walker, M. G. et al. (1999), "Prediction of Gene Function by Genome-Scale Expression Analysis: Prostate Cancer-Associated Genes," *Genome Research* 9:1198-1203.

Wilkinson, D. L. (May 1991). "Predicting the Solubility of Recombinant Proteins in *Escherichia coli*," *Biotechnology* 9:443-448.

Zhang, Y. et al. (1998) "Expression of Eukaryotic Proteins in Soluble Form in *Escherichia coli*," *Protein Expression and Purification* 12:159-165.

* cited by examiner

If a leader can't build consensus, the policy should be abandoned.

C.

| Scale | Q1 | Q2 | Q3 | Q4 | p (Q1 vs Q4) |
|---|---|---|---|---|---|
| NEO-FFI: "N" | 27.42 ± 9.73 | 22.54 ± 9.72 | 18.04 ± 8.15 | 12.14 ± 8.05 | <0.00001 |
| NEO-FFI: "E" | 22.00 ± 7.50 | 25.20 ± 7.14 | 26.96 ± 30.35 | 30.35 ± 6.03 | <0.00001 |
| NEO-FFI: "O" | 27.69 ± 6.77 | 30.69 ± 5.64 | 31.31 ± 5.85 | 31.63 ± 7.13 | <0.01 |
| NEO-FFI: "A" | 29.40 ± 5.27 | 30.70 ± 4.78 | 32.20 ± 5.75 | 36.93 ± 4.62 | <0.00001 |
| NEO-FFI: "C" | 29.20 ± 7.10 | 31.04 ± 7.61 | 33.11 ± 5.96 | 34.49 ± 6.16 | <0.0001 |
| DES-28 | 13.94 ± 13.04 | 12.45 ± 10.95 | 8.95 ± 6.81 | 7.32 ± 4.40 | <0.001 |

SYSTEM AND METHOD FOR USING PSYCHOLOGICAL SIGNIFICANCE PATTERN INFORMATION FOR MATCHING WITH TARGET INFORMATION

CROSS-REFERENCE TO RELATED APPLICATIONS

The present application is a continuation-in-part of U.S. application Ser. No. 09/899,348 filed Jul. 5, 2001, and claims the benefit of U.S. Provisional Application No. 60/216,469 filed Jul. 6, 2000, the contents of which are both incorporated herein by reference in their entirety.

The present application relates to the following provisional applications:

(1) Ser. No. 60/220,398, filed Jul. 24, 2000, titled "A method and system for a document search system using search criteria comprised of ratings prepared by experts";

(2) Ser. No. 60/215,492, filed Jul. 6, 2000, titled "System and Method for Anonymous Transaction In A Data Network and User Profiling of Individuals Without Knowing Their Real Identity"; and (3) Ser. No. 60/252,868, filed Nov. 21, 2000, titled "Interactive Assessment Tool."; which are incorporated fully herein by reference.

COPYRIGHT NOTICE

A portion of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

This invention relates generally to a computer-implemented system for creating a psychological, personality, or behavioral significance pattern for end users, more particularly, using such psychological significance pattern to match users with target information, such as information on products, services, and career openings.

BACKGROUND

Employers and advertisers have used personality profiling for decades to target specific individuals for specific job functions, products, or services. Recently, there has been an increasing unease regarding the use of such psychological tools, especially with respect to liability exposure and invasion of privacy considerations. This unease may arise from having third-party companies use personality profiles without the consent and/or knowledge of individuals. A tool is desired that enables individuals to knowingly use their personal significance pattern to search for target information, such as information on jobs, products, and services, thereby reversing the traditional control of such profiling data and alleviating the nonconsensual use of such information.

Search engines, such as Alta Vista, Excite, Webcrawler, and the like, are available on the Internet. Users typically enter a keyword on the Web page and the search engine returns a list of documents (e.g., through hyperlinks) where the keywords may be found. (Individuals and users herein are used interchangeably.) Depending on several factors such as the keywords used, the search engine's algorithms, available user related data, and the like, the resulting list may contain hundreds and even thousands of documents. A way to refine a search result, i.e., shorten the list returned, based on the personal characteristics and/or archetypes (e.g., "personality") of a user is highly desirable.

Targeted marketing of individuals on the Internet is also common. Displayed advertisements or offers may also be keyword-linked, such that advertisements indexed or related to certain keywords are displayed only if the user enters at least one of those keywords.

This could be seen, for example, by a user entering a keyword, e.g., "travel," on a search engine's search box and having advertisements related to the keyword "travel," e.g., books on travel, travel agencies, cruises, and the like, be displayed on the resulting Web page. Such keyword-linked mechanism, however, does not take into account the personality, behavior, or psychology of a user. (A user's personality, behavior, and psychology are herein collectively referred to as "personality"). A way to take into account a user's personality so as to have a more efficient and effective targeted marketing is highly desirable.

Targeted marketing conventionally also employs information about the user. Internet service providers (ISPs), for example, monitor users who are logged into their system. They monitor the user for information such as Web sites visited, purchasing pattern, types of advertisements clicked, gender, resident address, types of articles read, and the like. Using such information, a profile based on these prior and explicit declarations of interest is created for each user such that only advertisements that would likely interest the user are displayed on a Web page. However, such personal profile information is usually obtained without the consent or knowledge of the user and typically does not adequately predict a user's preference when a new situation occurs, such as a search for an item that the user has never requested or explicitly expressed an interest in before. It is often difficult or impractical to obtain specific preference data for an individual relating to all the products, services and information with which that individual may be usefully matched. Thus, a way to efficiently match users with target information (e.g., via a search engine or targeted marketing) which is not keyword-linked and does not require users to explicitly declare an interest in that information beforehand, is desired.

Target information as defined herein includes all information that a user may want to do a search on or information that a third party may want to present (e.g., auditory) or display to a user. It also includes information such as information on products and services, articles, music, logos, advertisements, images, videos, and the like.

Several patents address targeted marketing and searches on the Internet but none addresses users' control on their significance patterns enabling them to utilize their user significance patterns to search for target information based on their personality. None addresses the creation of user significance patterns by having users participate in an online psychological test and based on such psychological test taken, create and maintain classifications and archetypes that would be employed in matching target information to a particular user, whether such matching is a result of a search or targeted marketing. None addresses the creation and maintenance of classifications based on characteristics and/or archetypes, typically independent of the content of the target information and abstracted from independent information obtained from a psychological test taken, and using such classification to match information. U.S. Pat. No. 5,848,396 issued to Gerace teaches a method of targeting audience based on profiles of users, which are created by recording the computer activity and viewing habits of the users. This method is based on the explicitly declared interests of users. U.S. Pat. No. 5,835,087 issued to Herz et al. teaches a method of automatically selecting target objects, such as articles of interest to a user. The method disclosed in Herz generates sets of search profiles for the users based on attributes such as the relative frequency of occurrence of words in the articles read by the users, and uses these search profiles to identify future articles of interest. This method depends on the use of keywords, which also requires an explicit declaration of interest from the user.

European Patent Application EP-A-0718784 describes a system for retrieving information based on a user-defined profile. A server acting on behalf of the client identifies information on the basis of the user-defined profile, to generate a personalized newspaper which is delivered to the user. This provides for an automatic sorting of the large volume of data available on the World Wide Web to generate a subset of information which is tailored to the user's specific interest. However this system is only used for providing newspaper data to a static user whose desires may change periodically.

Traditional marketing methodology often involves making deductions of interest based on crude demographic attributes such as age, education level, gender and household income. However, these methods of ascertaining user interest in a specific product or service are typically very inaccurate and the level of targeting achievable through these demographic methods is typically poor. Moreover, some of these user attributes (such as education, age, and income) are subject to change over time. In the present invention, a method is described where the user's cognitive style is abstracted from a set of specific responses. This is a relatively stable "signature" or significance pattern qualifying an individual's interest in products, services and information (i.e., target information) in a fundamental manner. This significance pattern is not based on demographic attributes.

From the discussion above, it should be apparent that there is a need for an online psychological patterning system that enables users to classify themselves based on characteristics and/or archetypes, and to use such characteristics and/or archetypes to obtain or receive target information better suited to their personality. Such a system would have much wider applicability than currently used systems, because specific declarations of interest through selection of keywords or other similar user input would not be required for each user. Once the user's cognitive style is ascertained, the user's abstracted significance pattern would be applicable to a variety of foreseen and unforeseen situations over time.

What is needed is a system where the psychological significance pattern is under the user's control, where the user is classified under a classification that is created through an online psychological test, where the classification is used to match users with target information, and which contains the above features and addresses the above-described shortcomings in the prior art.

The methodology for the technical solution to these problems described hereunder, represents a generic set of procedures for rapidly analyzing complex biological data sets and uncovering novel relationships within them. This innovation is relevant to meeting (a) the general need for new tools to investigate complex systems; and (b) the practical need for shortcuts that will generate useful predictions from complex data, even under the computational constraints of 'point-of-use' devices.

Multivariate data derived from a variety of sources, represent a vector of measures that describe the state or condition of a particular subject. Accessing the descriptive and predictive capabilities inherent in these vectors requires the use of powerful but general analytic techniques. Standard statistical analysis packages that contain this "toolbox" of techniques are commercially available (e.g., SAS™, SPSS™, BMDP™), as are an array of texts describing general multivariate techniques (Johnson, 1998; Sharma, 1996; Tabachnick and Fidell, 1996; Srivastava and Carter, 1983; Romesburg, 1984). However, while supplying the basic tools for formal analysis, none of these resources specifically addresses the issues faced when trying to extrapolate from these kinds of data to probable outcomes in "real-world, real-time" settings.

Significant efforts to understand the complexity of dynamics these kinds of data provide are presently underway across an array of scientific disciplines. For example, RNA expression data generated from genome-wide expression patterns in the budding yeast $S.$ $cerevisiae$, were used by Eisen, et al. (1998) to understand the life cycle of the yeast. They employed a cluster analysis to identify patterns of genomic expression that appear to correspond with the status of cellular processes within the yeast during diauxic shift, mitosis, and heat shock disruption. The clustering algorithm employed was hierarchical, based on the average linkage distance method. Similarly, Heyer and colleagues (Heyer et al., 1999) developed a new clustering methodology that they refer to as a "jackknifed correlation analysis", and generated a complete set of pairwise jackknifed correlations between expressed genes, which they then used to assign similarity measures and clusters to the yeast genome.

Applying graph theory to this same kind of problem, Ben-Dor, et al (1999) developed another form of clustering algorithm, which they eventually applied to similar data. And Tamayo, et al. (1999), Costa and Netto (1999), and Toronen et al. (1999) each approached this kind of multivariate problem by developing a series of self-organizing maps (SOMs), a variation on the k-means clustering theme. Tamayo's experience is illustrative of the point. Microarray data for 6416 human genes were generated from four cell lines, each undergoing normal hematopoietic differentiation. After applying a variance filter, 1036 genes were clustered into a 6×4 SOM. These developed into archetypes descriptive of the expression patterns roughly associated with cell line and maturation stage.

Other techniques try to project the problem from the multivariate space into a series of bivariate ones. Walker, et al. (1999) developed a "Guilt-by-Association" model that in essence reduces a gene-by-tissue library to a matrix of "present" or "absent" calls in a series of standard 2×2 contingency tables. In their model, under the assumptions of the null hypothesis, the "presence" and "absence" calls across libraries for each fixed pair of genes should be distributed as a Chi-square. Using Fisher's Exact test, a ρ-value testing the assumption of "no association" is then calculated. They decrease their analysis-wide false positive rate by applying the appropriate Bonferroni correction factor to the multiple comparison problem. Applying this technique to a set of 40,000 human genes across 522 cDNA libraries, they were able to identify a number of associations between unidentified genes and those with known links to prostate cancer, inflammation, steroid synthesis and other physiological processes.

Greller and Tobin (1999) developed a more general approach to the pattern recognition/discrimination problem. They derived a measure of statistical discrimination by establishing an analysis that transposes the clustering question into an outlier detection problem. Assuming a uniform distribution of interstate expression, and by accounting for both a statistical distribution of baseline measures and uncertainty in the observation technology, they derive a decision function that assigns a subject, in their case a gene, to one of three states: selectively upregulated, selectively downregulated, or unchanged. And Brown, et al. (2000) derived a knowledge-based analysis engine based on a technique known as "support vector machines" (SVMs). These "machines" are actually nonlinear in silico discrimination algorithms that "learn" to discriminate between, and derive archetypes for, binarially attributed data.

Complex biological systems often yield measurements that cannot easily be analyzed by reductionist means. As new technologies expand the rate, scope and precision with which such measurements are made, there is an accompanying need for new analytical tools with which to understand the underlying biological phenomena. Furthermore, ubiquitous access to modest computational power (in handheld devices, for instance, or on web client-server systems) has made it possible to imagine a range of field applications for such analytical tools, provided they are simpler and easier to use than more formal statistical packages. Protigen, Inc. (Applicant herein) has been testing the use of conventional web server-based architectures (accessible through desk-top and wireless handheld devices) for real-time analysis of complex biological data, consistent with the modest computational overhead that can be afforded each simultaneous user in a large web community. The goal is to explore the possibility of applying such tools to such areas as the real-time adjustment of online education to a user's cognitive (learning) style, point-of-care serum diagnostics for osteoporotic women, and the accurate prediction of a protein's solubility in a heterologous system based on its sequence.

Those skilled in the art will further recognize the wide applicability of such methodology to problems in areas ranging from psychology, knowledge management, artificial intelligence, and text-searching to cancer and pharmacogenomics. The following cited example data sets are not intended to limit the scope of the invention:

1. Cognitive test and behavioral preference data from a cohort of 1373 anonymous online users. The fundamental assumption underlying this type of psychometric analysis, a staple of personality psychology over the past fifty years, is that the human mind is a complex biological system whose state attributes can be reliably measured by self-reports. A second assumption is that these state attributes influence human behavior. The results obtained from our preliminary analysis are described in greater detail below.

2. Detailed serum biochemistry and 3-year bone mineral density data from a cohort of 220 osteoporotic women. A point-of-care diagnostic that could deduce the rate of aggregate bone loss from multivariate clues provided by the serum levels of insulin-like growth factors, selected binding proteins, and CICP would be invaluable for identifying post-menopausal women at high risk of developing complications from osteoporosis. An exciting possibility is that the relative levels of these biochemical markers carry information that cannot be derived from the levels themselves.

3. Solubility and amino acid sequence data from a set of 180 eukaryotic proteins expressed in *E. coli* as part of a genomics program. The effects of amino acid composition on heterologous protein solubility have been investigated by a number of groups (Wilkinson and Harrison, 1991; Zhang et al, 1998) but the interaction of a protein's structural and chemical attributes with a foreign environment appears to be multivariate in nature and has, so far, eluded all predictive algorithms. Since less than 30% of any random cDNA sequence will result in soluble (i.e. assayable) protein when expressed in an *E. coli* host, even with the use of fusion partners such as thioredoxin, there is built-in inefficiency in any high-throughput screen employing a bacterial cell for evaluating eukaryotic collections. An appropriate pre-screen in silico could lower screening costs by a factor of 3 or more.

REFERENCES CITED ABOVE

Ben-Dor, A., R. Shamir, and Z. Yakhini. 1999. Clustering gene expression patterns. *J. Comp. Biol.* 6:281-297.

Brown, M. P. S., W. N. Grundy, D. Lin, N. Cristianini, C. W. Sugnet, T. S. Furey, M. Ares, D. Hausller. (2000) Knowledge-based analysis of microarray gene expression data using support vector machines. *PNAS* 97:262-267.

Costa, J. A. and M. L. Netto. (1999). Estimating the number of clusters in multivariate data by self-organizing maps. *Int'l. J Neural Syst.* 9(3):195-202.

Eisen, M. B., P. T. Spellman, P. O. Brown, and D. Bottstein. (1998). Cluster analysis and display of genome-wide expression patterns. *PNAS* 95:14863-14868.

Greller, L. D. and F. L. Tobin. (1999). Detecting selective expression of genes and proteins. *Genome Res.* 9:282-305.

Heyer, L. J., S. Kruglyak, and S. Yooseph. 1999. Exploring expression data: Identification and analysis of coexpressed genes. *Genome Res.* 9:1106-1115.

Johnson, D. E. (1998) *Applied Multivariate Methods for Data Analysis*. Duxbury Press. Pp. 567.

Keller G and Snodgrass R (1999) Human embryonic stem cells: The future is now. *Nature Med.* 5:151-152.

Robinson, J. P., Shaver, P. R. and Wrightsman, L. S. eds. In "Measures of Personality and Social Psychological Attitudes". Academic Press, San Diego, Calif. 1991.

Romesburg, H. C. (1984). *Cluster Analysis for Researchers*. Lifetime Learning Publications. Pp. 334.

Sharma, S. (1996) *Applied Multivariate Techniques* John Wiley & Sons. Pp. 493.

Srivastava, M. S. and E. M. Carter. (1983) *An Introduction to Applied Multivariate Statistics*. North-Holland. Pp. 394.

Tabachnick, B. G. and L. S. Fidell. (1996) *Using Multivariate Statistics*. Harper Collins. Pp. 860

Tamayo, P., D. Slonim, J. Mesirov, Q. Zhu, S. Kitareewan, E. Dmitrovsky, E.S. Lander, and T. R. Golub. (1999). Interpreting patterns of gene expression with self-organizing maps:methods and application to hematopoietic differentiation. *PNAS.* 96:2907-2912.

Toronen, P., M. Kolehmaninen, G. Wong, and E. Castren. (1999). Analysis of gene expression data using self-organizing maps. *FEBS Lett.* 451(2):142-146.

Walker, M. G., W. Volkmuth, E. Sprinzak, D. Hodgson, and T. Klingler. 1999. Prediction of gene function by genome scale expression analysis: prostate cancer-associated genes. *Genome. Res.* 9:1198-1203.

Wilkinson, D. and Harrison, R. (1991) Predicting the solubility of recombinant proteins in *Escherichia coli*. *Bio/Technology* 9: 443-448.

Zhang, Y., Olsen, D., Nguyen, K., Olson, P., Rhodes, E. and Mascarenhas, D. (1998) Expression of eukaryotic proteins in soluble form in *E. coli*. *Protein Express. Purif.* 12: 159-165.

BRIEF SUMMARY OF THE INVENTION

What is claimed is a computer implemented method for matching a computer user with target information by creating a classification significance pattern for the user through the use of a psychological test, by creating a classification index for the target information, and by finding relevant target infor- mation for the user by matching one or more elements of the classification significance pattern to the target information classification index. Also claimed are apparatus and computer-readable medium to accomplish similar purposes.

A classification significance pattern herein includes psychological, behavioral, personality, or other attributes that may be tested, created, and/or maintained by a psychological testing tool for a user. Such classification significance pattern includes, but is not limited to, the classification of a user into certain characteristics and/or archetypes or models.

The invention enables a user to take an online psychological test, have the system automatically score such test, have the system create and/or maintain a classification significance pattern for the user, such as a classification significance pattern that contains the characteristics and/or archetypes measured by the online psychological test, and have the system use such classification significance pattern to match users with target information. Optionally, the user may log into the system and take the online psychological test anonymously, by supplying a pseudonym (i.e., a fictitious name), such as a user-supplied user name, and thus, enforcing an additional level of privacy. (To "create a classification significance pattern" herein refers to the creation and maintenance (updates) of a classification significance pattern.)

Because users voluntarily take the test and are typically put on notice, for example, by a notice on the Web page, the issue of privacy and control of the user's classification significance pattern is placed under the user's control. Furthermore, because the users may log into the system anonymously by supplying a pseudonym, the issue of unsolicited marketing communications is alleviated.

The online psychological test measures various aspects of a user, such as personality, psychology, disposition, behavior and the like. Based on these aspects, classifications are created which are used to match the users with target information, such that both the user and the target information contain classification information (e.g., fields in a database). Furthermore, the target information may be classified, for example, by characteristics and/or archetypes rather than or in addition to the contents of the electronic information (e.g., having a search filtered not only by keywords but also by classifications measured by the psychological test).

DETAILED DESCRIPTION OF THE INVENTION

The following detailed description illustrates the invention by way of example, not by way of limitation of the principles of the invention. This description will clearly enable one skilled in the art to make and use the invention, and describes several embodiments, adaptations, variations, alternatives and uses of the invention, including what we presently believe is the best mode of carrying out the invention.

The invention will be described by way of illustration with reference to a specific psychological testing method, referred to as a Personality Trait Topography ("PTT"), but it should be understood that other psychological testing tools and profiling methods may also be employed in the present invention. Furthermore, although the customer input and actions described refer to inputs from a keyboard or a mouse, this invention also covers other interfaces such as those using voice or a touch screen. Similarly, the specific computational methods and correlation schemes described herein may be replaced with equivalent statistical methods within the framework and claims of the present invention.

System Architecture

Figure 1:
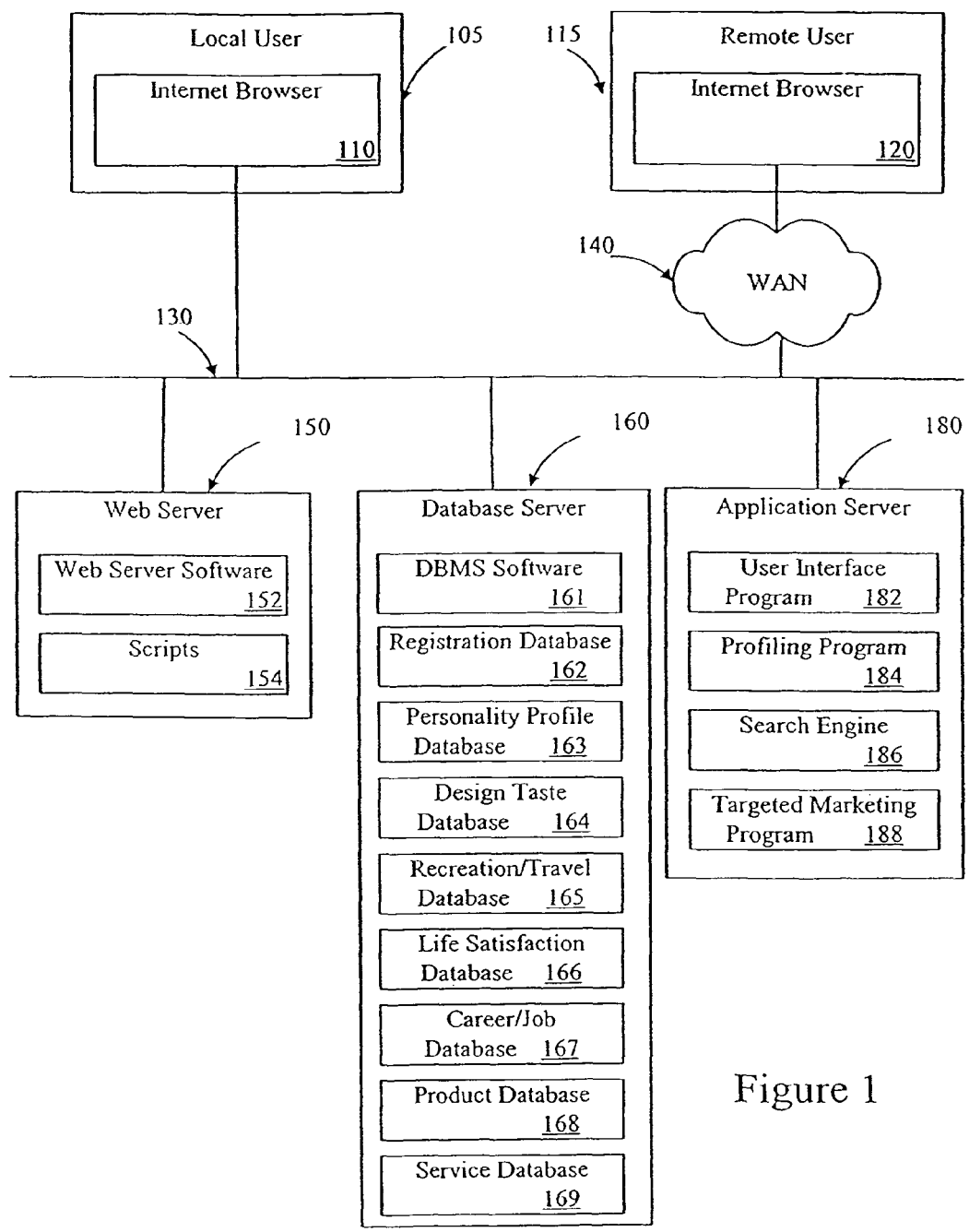
FIG. 1 is a diagram illustrating an exemplary architecture of the present invention.

FIG. 1 shows an exemplary system architecture to carry out the present invention, including a standard Internet or Intranet web server 150 that is capable of sending Web pages and processing scripts, a database server 160 that stores and handles database manipulation and updates, and an application server 180 that contains and executes the logic embodying the features of the present invention.

A user (local user 105 or remote user 115, respectively) employs typically a computer containing an Internet browser software 110, 120 (or an Internet-enabled appliance) to access and connect to the Web server 150, database server 160, and application server 180.

The Web server 150, database server 160, and application server 180 are connected to a data network, such as a local area network 130 which may also be connected to the Internet through a wide area network (WAN) 140. The Web server is a device, typically a computer, which contains a Web server software 152 and scripts 154. Scripts are programs that contain instructions that may be executed, for example, by a Web server software. Scripts are typically written using scripting languages, such as JavaScript, Microsoft® VBScript, Microsoft® Active Server Page, and Allaire® ColdFusion. Microsoft® Internet Information Server is an example of a Web server software.

The database server 160 is a device, typically a computer, which contains a database management system (DBMS) software 161, as well as the data used and/or manipulated in the present invention. Microsoft® SQL Server and Oracle's DBMS products are examples of DBMS software.

The registration database 162 maintains data on users who have registered in the system. It contains fields such as user name, password, demographic information (e.g., zip code), user occupation, household income, education, gender, whether the user has completed the psychological test, the user's characteristic(s) and/or archetype(s) and the like in the preferred embodiment, the user name is a pseudonym that is user-supplied to provide the user with another level of privacy. Information contained in the registration database 162 (FIG. 1) is typically obtained when the user first registers with the system, however, calculated or derived information, such as the numeric or textual representation of the user characteristic may also be stored.

The preferred embodiment of the invention uses a psychological test or trait evaluation method developed by the inventor herein generically referred to as "Personality Trait Topography" (PTT). The PTT comprises a psychometric inventory in which user responses to a set of questions are solicited on a seven-point scale. Other embodiments include a number of psychological tests, preferably consisting of a personality test, a design taste test, a color test, an interactive game module, a recreation/travel test, a life satisfaction test, and a career/job test. An alternative psychological testing methodology may be substituted for the PTT.

The database elements of the preferred PTT are shown in FIG. 1. The personality significance pattern database 163, the design taste database 164, the recreation/travel database 165, the life satisfaction database 166, and the career/job database 167 maintain data on the responses by and scores of the user in the personality test, the design taste test, the recreation/travel test, the life satisfaction test, and the career/job test, respectively.

FIG. 1 also shows product database 168 maintains data on products available within the system including: the classification of the products (compatible with or matching that measured by the psychological test). Fields include product name, description, correlation value, and the like. This classification is described below in an exemplary description with respect to FIG. 10. Relationships are initially established between archetypes, on the one hand, and behaviors, preferences or attitudes on the other. For example, individuals assigned to archetypes can be polled on the extent of their preferences, or self-reported skills. Using canonical correlation, chi square, and other appropriate tools well known to a professional statistician, actual numerical values linking archetypes to an increased (or decreased) affinity for a particular product, activity, behavior or attitude can be derived. Unlike previous methods for measuring personality and style, the PTT generates robust, quantitative and reliable relationships between archetypes and each of dozens of behavioral and product categories. Such known relationships can, in turn be used to generate reliable predictions of an individual's disposition to the given items, provided that individual's archetype pattern has first been measured using the PTT.

The service database 169 maintains data on services available within the system, including the classification of the services (compatible with or matching that tested by the psychological test.) Fields include service name, description, correlation value, and the like.

The product and service databases (which are examples of target information), as well, as other information database, contain fields that match or are compatible with the classification of the users. The classification, such as for the product or service, is typically determined by the supplier of the target information. A user interface, as part of the system, may be provided enabling a supplier of such information to enter or indicate the proper classification, for example, through check boxes, lists, and the like.

For example, in the preferred embodiment including the PTT, if the supplier believes that a product would be of interest to individuals with an "M" (mythic) characteristic or to those with the "A" (artist) archetype, the supplier of information checks these two boxes to have an "M" in the mythic_empiric field and a "Yes" in the artist field be stored in the appropriate databases. This way, the target information may be matched with the user's classification profile. The PTT is described in detail below.

The application sever 180 is a device, typically a computer, which contains certain application software, such as the user interface program 182, the profiling program 184 (e.g., Brain Terrain), the search engine 186, and the targeted marketing program 188.

The user interface program 182 generally comprises program logic that displays Web pages to users, typically web pages enabling users to register within the system, take the psychological test, or search the system for products or services. In the preferred embodiment, it is employed using a Web server software in conjunction with scripts.

The profiling program 184 is a software program that calculates and creates the user significance pattern by considering user's responses to the psychological test and classifying the user, e.g., based on the characteristics and archetypes measured by the psychological test.

The search engine 186 is a software program that enables users to search for target information in the system, such as products, services, and employment opportunities, based on the user's significance pattern. It may also provide user interface logic. (Thus, if a user is interested in a product, the user searches for target information about the product.)

One skilled in the art will recognize that the search algorithm employed by the Search Engine 186 (FIG. 1) may be employed in a number of ways. Any search methodology that computes and sorts outcomes according to predetermined algorithmic relationships between the PTT personal style patterns and behavioral or other outcomes, may be used. The methods by which these algorithmic relationships can be established are described hereunder.

The targeted marketing program 188 is a software program that contains logic that determines what advertisement is to be displayed.

One skilled in the art will recognize that the system described in FIG. 1 may be implemented in a single computer, where the database are stored in computer readable medium, such as in a hard disk drive or a CD ROM, as well as having the user interface described above, not generated by a web server software and scripts, but rather displayed and executed by a interpretive or compiled programming language such as Visual Basic or C++.

Furthermore, while the above embodiment illustrates the various components, such as the web server 150, the database server 160, and the application server 180 embodied in an individual device, one of ordinary skill in the art will realize that the functionality may be distributed over a plurality of computers. One of ordinary skill in the art will also recognize that the databases defined herein, as well as the fields in the database, may be modified, added, or deleted depending for example, on what psychological test is employed, the information desired to be stored and monitored, the system and/or implementation design, and the like. For example, an articles database containing articles classified by the characteristics defined in the psychological test may be added to provide users in the system with articles suited to their personality.

One skilled in the art will also recognize that the psychological test need not be taken online, but rather the user significance pattern, for example, as a result of a written (non-online) psychological test), may be directly stored into the database, e.g., the registration database 162 in FIG. 1.

Figure 2:
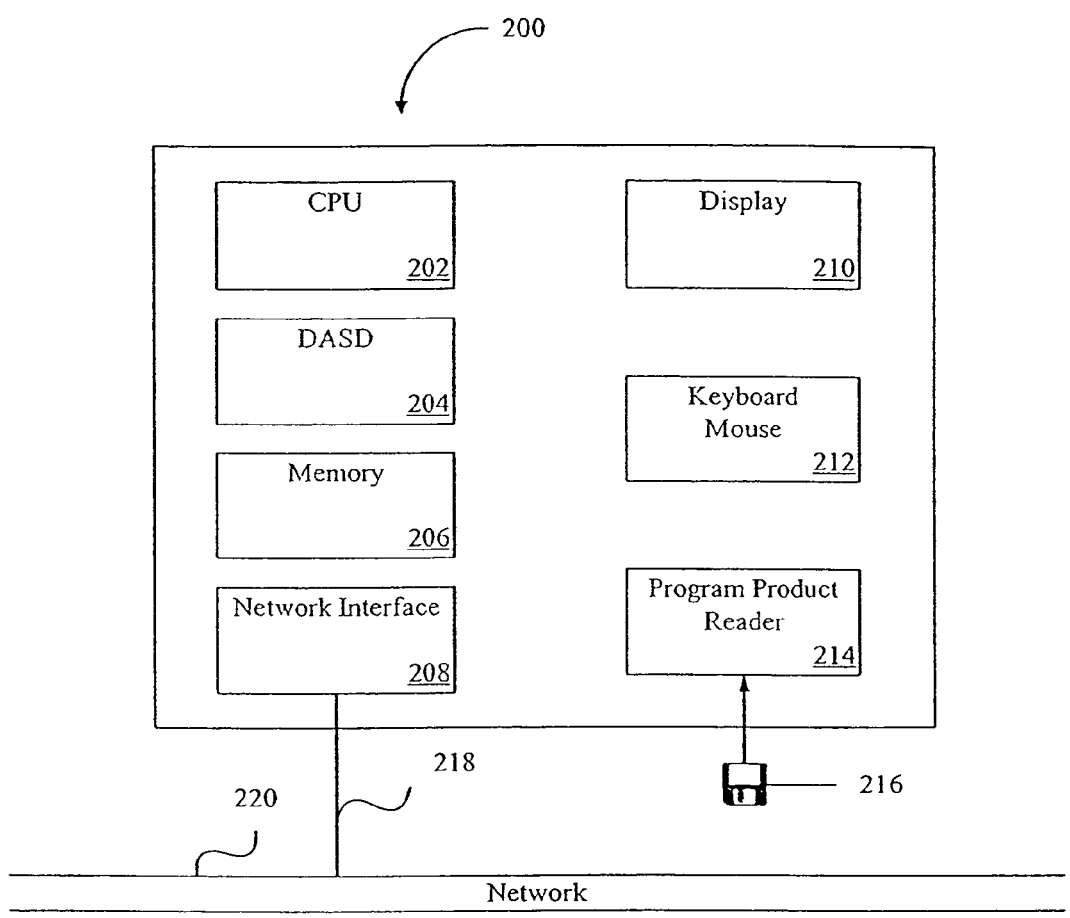
FIG. 2 is a block diagram representation of one of the computers in the system illustrated in FIG. 1.

FIG. 2 is a block diagram of an exemplary computer 200 such as might comprise any of the servers or computers in FIG. 1. Each computer 200 operates under control of a central processor unit (CPU) 1102, such as a "Pentium™" microprocessor and associated integrated circuit chips, available from Intel Corporation™ of Santa Clara, Calif., USA. A computer user can input commands and data from a keyboard and mouse 212 and can view inputs and computer output at a display 210. The display is typically a video monitor or flat panel display device. The computer 200 also includes a direct access storage device (DASD) 204, such as a fixed hard disk drive. The memory 206 typically comprises volatile semiconductor random access memory (RAM). Each computer preferably includes a program product reader 214 that accepts a program product storage device 216, from which the program product reader can read data (and to which it can optionally write data). The program product reader can comprise, for example, a disk drive, and the program product storage device can comprise removable storage media such as a floppy disk, an optical CD-ROM disc, a CD-R disc, a CD-RW disc, DVD disk, or the like. Each computer 200 can communicate with the other connected computers over the network 220 through a network interface 208 that enables communication over a connection 218 between the network and the computer.

The CPU 202 operates under control of programming steps that are temporarily stored in the memory 206 of the computer 200. When the programming steps are executed, the pertinent system component performs its functions. Thus, the programming steps implement the functionality of the system components illustrated in FIG. 1. The programming steps can be received from the DASD 204, through the program product 216, or through the network connection 218. The storage drive 204 can receive a program product, read programming steps recorded thereon, and transfer the programming steps into the memory 206 for execution by the CPU 202. As noted above, the program product storage device can comprise any one of multiple removable media having recorded computer-readable instructions, including magnetic floppy disks, CD-ROM, and DVD storage discs. Other suitable program product storage devices can include magnetic tape and semiconductor memory chips. In this way, the processing steps necessary for operation in accordance with the invention can be embodied on a program product.

Alternatively, the program steps can be received into the operating memory 206 over the network 218. In the network method, the computer receives data including program steps into the memory 206 through the network interface 208 after network communication has been established over the network connection 218 by well-known methods that will be understood by those skilled in the art without further explanation. The program steps are then executed by the CPU 202 to implement the processing and features of the present invention.

Figures 3, 4:
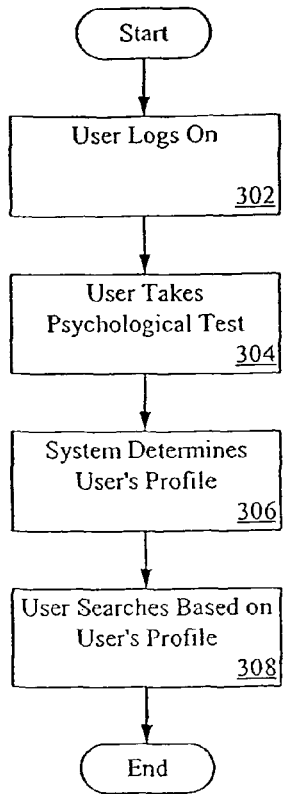
FIG. 3 illustrates a high level block diagram showing how a user obtains a classification profile and uses such profile to search for information.
FIG. 4 is an exemplary representation of a user interface enabling a user to enter a response to a question from a psychological test.

FIG. 3 illustrates an exemplary logic flow on how a user uses his or her own significance pattern to conduct searches. The user first logs onto the system as shown in step 302. The user does this by accessing a web site using an Internet browser 110, 120 (as shown in FIG. 1), typically by typing the URL address on the Internet browser address box or by selecting the Web site via a hyperlink. A user who is new to the system is asked to register with the system by supplying a user name and a password. The user name and password are stored in the registration database 162 (FIG. 1). Once the user logs and registers with the system, the user takes the psychological test, as shown in box 304. The psychological test may be broken down into a series of mini-tests.

Once the user completes the psychological test, the profiling program 184 (illustrated in FIG. 1) converts each test response by the user to a raw score points or index. These raw points are further manipulated to create a significance pattern represented by numbers and text. The system then stores the user's significance pattern at step 306 in the Registration database 162 (FIG. 1). At any time after the creation and storing of the significance pattern, the user may use his/her significance pattern to conduct searches, as shown in box 308, thereby making the significance pattern part of the search criteria.

For example, a search for the keyword "travel" results in a user interface or Web page listing tours suited to the user's personality. For example, if the user has been determined to having a personality that prefers fixed schedules rather than spontaneity, tours that have a number of preplanned activities are listed rather than those tours with little or minimal pre-planned activities or have those non-preferred tours listed last on the list. The classifications of the tours based on the characteristics and archetypes measured (e.g. Table I and II below) are stored as part of the target information database, e.g., the service database 169 (FIG. 1).

Employment matching or searching may also be done. One way of employing the features of the present invention is to have supervisors take a similar psychological test and create a significance pattern for such supervisors. Thus, a search for jobs, for example, results in a list of jobs, considering both the user's personality and that of the prospective supervisor.

Personality Trait Topography

The preferred psychological testing methodology is the PTT, which may be used as follows:

A field indicating the archetype being measured may be added in the product, service, or other target information database (such as, employment database). For example, the product or service database contains a field called Empiric-_Mythic, which is one archetype tested by the psychological test. (See Table I below). An "M" in this field indicates that the product is more suited for users who are "mythic," a "E" indicates that the product is more suited for users who are "empiric," and a "" (blank or null string) indicates that the product equally applies regardless of the characteristic.

In the preferred embodiment, the invention uses a psychological test, herein referred to as "PTT", which measures several characteristics (listed below in Table I).

TABLE I

Sample Characteristics of PTT

| Index | Characteristics |
|---|---|
| 1 | OJ ("O" = Open-Ended/"J" = Judgmental) |
| 2 | FU ("F" = Focused/"U" = Unfocused) |
| 3 | CB ("C" = Concrete/"B" = Abstract) |
| 4 | TP ("T" = Territorial/"P" = Pacifist) |
| 5 | EM ("E" = Empiric/"M" = Mythic) |
| 6 | AG ("A" = Anomic/"G" = Gregarious) |
| 7 | IX ("I" = Internal Locus of Control/"E" = External Locus of Control) |

PTT is conducted by asking a user a set of questions addressing the characteristics that are measured. Based on the user's response, the profiling program 184 (in FIG. 1) then classifies the user.

1. Index OJ.

Index OJ measures the novelty-seeking characteristic of a user. Type "O" open-ended) users consider all decisions to be provisional and, thus, are constantly reevaluating issues. They do not care much for regimentation, and generally will ignore rules that they deem do not make sense. Typically, they are spontaneous and are happy to make plans as they go along. Type "J" (judgmental) users, on the other hand, are typically driven by rules, tradition, and formal decision-making processes, and are generally law-abiding. They expect and feel comfortable with some amount of regimentation and structure in their lives. They typically plan ahead and feel uncomfortable just 'playing it by ear.'

2. Index FU.

Type "F" (focused) users (line 2) typically tend to be driven, "one-track-minded," "goal-oriented," and intensely focused on their endeavors. Often they will work for hours, while completely oblivious to surroundings. They tend to take things seriously, and sometimes, need to learn to lighten up. Type "U" (unfocused) users, on the other hand, tend to take things lightly. They tend to take frequent breaks while working and are very conscious of their immediate surroundings and, thus, are easily distracted from their current work or purpose. They tend to have the philosophy that having fun is more important than achieving goals.

3. Index CB.

Type "C" (concrete) (line 3) users tend to be detail-oriented, tend to be very sensitive to their immediate surroundings, are more interested in the details rather than in the big picture. Generally, they have little patience for grand ideas and theories, and are more likely to focus on the present rather than on the future. Type "B" (abstract) users, on the other hand, tend to easily synthesize information and abstract ideas. Their insights make them excellent "high-altitude" or "big picture" analysts. They usually are good inventors and are able to easily conceptualize complex systems. They tend to enjoy reading novels with complicated but ingenious plots and tend to be good at extrapolating to the future.

4. Index TP.

Type "T" (territorial) users (line 4) tend to be aggressive, to be very loyal, to root for the home team, to not value diversity, to be very team-oriented, and to be fierce competitors. Thus, they will often exclude "outsiders." Type "P" (pacifist) users, on the other hand, tend to look for mediated solutions to conflict and are more willing to consider rehabilitation than punishment. They tend to be "politically correct," to be very inclusive of other cultures and ways of life, to have diverse interests, and to see the planet as an organic whole.

5. Index EM.

Type "E" (empiric) users (line 5) are driven primarily by logic, not subject to making emotional decisions as other people, at times, cold and unemotional, methodical and hierarchical in their thinking, and often very intelligent. They tend to look for the facts of the case before making a decision. Type "M" (mythic) users are generally spiritual, superstitious, and very likely to believe in the supernatural, in an after-life, or reincarnation. They are likely to consider the existence of angels and extraterrestrials and believe in their existence. They tend to be exceptionally receptive to nature, art, and beauty.

6. Index AG.

Type "A" (anomic) (line 6) users are often loners and enjoy solitary pursuits. They tend to place a low value on social status, fashion, and chitchat, tend to be independent thinkers and usually develop extremely close relationships with pet animals. Type "G" (gregarious) users, on the other hand, often value their status within their own social group, and will tirelessly work to improve their standing. They tend to pay great attention to appearances and grooming, and "fitting in" with their friends. They are great to have at parties and often adopt socially extroverted behaviors, even if this is an unnatural characteristic of their personalities.

7. Index IX.

Type "I" (internal locus of control) users (line 7) tend to take responsibility for their own actions and the consequences thereof, and generally have a better self-esteem than average people. They see their lives as being under their own control, with the outcome dependent upon their own actions. Type "X" (external locus of control) users, on the other hand, have low self-esteem, tend to blame luck or some external authority for their own failings in life, and tend to seek and often meekly submit to the direction from others. They usually feel a sense of powerlessness about their world and feel that they are incapable of changing the world to their own advantage.

Index DH

"D" types are likely to be socially sophisticated, charming, deceptive, even manipulative. "H" types lack social graces, but tend to be down-to-earth honest.

Index RS

Type "R" is a Risk-Taker. "S" is Security-Conscious.

Archetypes are derived from the pattern of scores obtained by individuals across the above indexes, or scales. Archetypes are heuristic abstractions that can be constructed in a number of ways. The example shown below illustrates one method currently in use. Other methods may be developed in the future. Table II below shows sample archetypes based on the characteristics listed in Table I.

TABLE II

Sample Archetypes

| Archetype (Most Frequent Characteristics) | Analysis |
| --- | --- |
| Artist (M, A, U, O) | Favored professions: artist, social worker<br>Disfavored professions: lawyer, entrepreneur<br>Job Performance: poor at dealing with both subordinates and authority<br>Musical tastes: non-traditional forms of music (eclectic)<br>Areas of greatest life satisfaction: spiritual life<br>Areas of lowest life satisfaction: income, current job<br>Favorite activities: music, reading, creative pursuits |
| Banker (X, J, C, T) | Favored professions: engineer, scientist, banker<br>Disfavored professions: lawyer, politician<br>Job Performance: good with superiors, excellent record-keeping<br>Musical tastes: rock-n-roll, country<br>Areas of greatest life satisfaction: community, government<br>Areas of lowest life satisfaction: current job, income<br>Favorite activities: music and reading, social activities |
| Counselor (P, O, I, M) | Favored professions: artist, social worker<br>Disfavored professions: scientist, engineer<br>Job Performance: good at group processes, meetings<br>Musical tastes: jazz, blues<br>Areas of greatest life satisfaction: home/dwelling, career success |

TABLE II-continued

Sample Archetypes

| Archetype (Most Frequent Characteristics) | Analysis |
|---|---|
| Devotee (C, X, P, M) | Areas of lowest life satisfaction: government, local community<br>Favorite activities: social activities, creative pursuits<br>Favored professions: social worker<br>Disfavored professions: lawyer, entrepreneur<br>Job Performance: terrible at dealing with subordinates, great record-keeping<br>Musical tastes: all kinds |
| General (T, B, E, J) | Areas of greatest life satisfaction: family, dwelling, spiritual life<br>Areas of lowest life satisfaction: income, available leisure time<br>Favorite activities: outdoor recreation<br>Favored professions: entrepreneur, engineer<br>Disfavored professions: artist, social worker<br>Job Performance: excellent with subordinates, hates group process of decision-making<br>Musical tastes: rock-n-roll |
| Manager (F, J, G, E) | Areas of greatest life satisfaction: choice of profession, family, and community<br>Areas of lowest life satisfaction: current job, income<br>Favorite activities: social activities, spectator sports<br>Favored professions: entrepreneur<br>Disfavored professions: artist<br>Job Performance: excellent dealing with superiors, okay with record-keeping<br>Musical tastes: classical |
| Politician (I, B, O, M) | Areas of greatest life satisfaction: career success<br>Areas of lowest life satisfaction: friends, community, available leisure time<br>Favorite activities: outdoor recreation, sports<br>Favored professions: politician, lawyer<br>Disfavored professions: engineer<br>Job Performance: poor record-keeping, poor at dealing with the boss, great with subordinates.<br>Musical tastes: gospel, light classical |
| Trustee (G, E, F, C) | Areas of greatest life satisfaction: choice of profession, career success<br>Areas of lowest life satisfaction: family relationships, physical fitness<br>Favorite activities: sailing, music and reading, social activities<br>Favored professions: lawyer<br>Disfavored professions: artist<br>Job Performance: excellent with bosses and subordinates, poor record-keeping<br>Musical tastes: all kinds |
| Soldier (U, E, I, T) | Areas of greatest life satisfaction: choice of profession, physical fitness<br>Areas of lowest life satisfaction: friends, spiritual life<br>Favorite activities: outdoor recreation, spectator sports<br>Favored professions: engineer<br>Disfavored professions: artist<br>Job Performance: great at dealing with subordinates, hates meetings<br>Musical tastes: easy listening, top 40<br>Areas of greatest life satisfaction: physical fitness, community<br>Areas of lowest life satisfaction: dwelling, family relationships<br>Favorite activities: music and reading |

The PTT, described, herein is also a psychological test that creates cognitive user significance patterns that are typically "stable" over time. That is, changeable data such as demographic data, address, phone number, age, etc. is not used.

An additional psychological test called eSAIL ("Mayflower Online Survey of Adaptability, Individualism and Leadership") is based on a novel classification system designed to measure human adaptability and entrepreneurial traits, and is described herein.

One skilled in the art will recognize that other characteristics and archetypes, including other classification, may be measured and developed to classify users. Furthermore, one skilled in the art will recognize that other psychological testing methods aside from PTT may be employed to create a classification that would be used by the system to match users with electronic information.

User Interface and Classification Method

FIG. 4 is an exemplary representation of a user interface or GUI, such as a Web page, enabling a user to take a psychological test, e.g., a PTT assessment. The personality test portion of PTT quantifies the user's personality. The personality test asked a set of questions, to which the user may respond by choosing one of the displayed options. For example, in FIG. 4, the question 402 ("If a leader can't build consensus, the policy should be abandoned") is a sample question testing the personality of the user. The user responds by clicking on one of the option boxes (as shown in 404). Each question is scored on a seven-point scale (−3 to +3) where −3 is "Strongly Disagree" and +3 is "Agree Strongly," (with each user's response contributing to the relevant characteristic and/or archetype measured, e.g., adding 3 points or subtracting 3 points). The user's response is then stored in an appropriate user storing database, in this case, the personality profile database 163 (in illustrated in FIG. 1).

A series of such questions is provided to measure each trait scale, however, unlike many previous psychological inventories, the PTT does not limit each question to a single underlying trait. Instead, each question may contribute to multiple scales. The precise contribution to each scale is hypothesis-based, and may be adjusted empirically until the results obtained are consistent. An alternative approach is to perform 'factor analysis' by traditional statistical methods and then use the results from such an analysis to assign the scoring matrix.

The response of the user may be ignored in the calculation of the significance pattern depending on traditional measures such as factor analysis and discriminant analysis. Answers to questions that do not show a factor analysis, i.e., show a 0.40 correlation coefficient or less, for example, to the desired characteristic, are ignored in determining or calculating the significance pattern.

The profiling program 184 (illustrated in FIG. 1) calculates the mean and standard deviation for all answers for each user and then normalizes the answers based on these two numbers, thereby expressing a set of responses as normalized standard deviations. Each response is then multiplied by an appropriate factor, to generate an aggregate score set, representing the significance pattern. Each aggregate score set contains a score for each characteristic listed in Table 1.

The aggregate score set is then further normalized by taking the aggregate score set of a suitable large number of users (e.g., more than 75), calculating a mean and standard deviation for each type of aggregate score for each characteristic, and then further normalizing each user's score for that distribution. The final result is a set of normalized aggregate scores expressed as standard deviations, i.e., the scores are normalized within a normalized aggregate score set compared to the result of each user.

The profiling program 184 generates a significance pattern or a portion of it based on the user's responses. The significance pattern may also be expressed as a mnemonic string of characters that contains the three most deviant characteristic scored (normalized aggregate scores), plus an indicator for the strongest correlation to the existing archetypal patterns.

For example, in a system including PTF method, a user may be categorized as "MAU9R" meaning he is a "mythic," "anomic," and a "unfocused." The string "9R" means that in a scale of 1 to 10, the user is a 9 in the Artist archetype shown in Table II.

Referring back to FIG. 3, a search 308 requesting for products with a "travel" keyword, for example, results in a web page listing products that contain an "M" on the Empiric_Mythic field, "A" on the Anomic_Gregarious field, or "U" on the Focused_Unfocused field.

The design taste psychological test measures the design and taste preference of the user. The design taste test displays a number of sketches of house interiors and asks the user's preference by having the user select one of the options displayed (e.g., "Strongly Dislike," "Dislike," "Slightly Dislike," "Neutral," "Like Slightly," "Like," and "Love It."). Each question is scored on a seven-point scale (−3 to +3) where −3 is "Strongly Dislike" and +3 is "Love It."

The Recreation/Travel survey measures the recreation and travel preference of the user by asking the user to enter his or her response in an online survey form. (This online survey form is implemented by using a Web server software and scripts.) The user, for example, is asked to list the titles of three favorite books, to list the titles of five favorite movies, to list five activities (unrelated to the user's employment) which the user has spent the most time during the past year, and to list three subjects (unrelated to the user's employment) which the user wants to learn more about. The user enters the responses into the online form and accordingly submits the responses by clicking on the "Submit" button.

The Life Satisfaction Survey measures the user's satisfaction with life in general. A set of questions is posed to the user, which the user responds to by selecting an option box ("Highly Unsatisfied," "Unsatisfied," "Slightly Unsatisfied," "Neutral," "Slightly Satisfied," "Satisfied," and "Very Satisfied.") Sample questions include: "How satisfied are you with your current job?"; "How satisfied are you with your current choice of profession?"; "How satisfied are you with your current family income?;" "How satisfied are you with the amount of time you have available for recreational activities?"; and the like. Each question is scored on a seven-point scale (−3 to +3) where a score of −3 is "Highly Unsatisfied" and +3 is "Very Satisfied."

The Jobs/Careers Test measures how compatible a user is with a particular job. Questions include, for example, "With appropriate training, how well do you think you could perform as an accountant or banker?;" "With appropriate training, how well do you think you could perform as a scientist?;" "With appropriate training, how well do you think you could perform as a high school schoolteacher?;" and the like. The user gives his answer by selecting one of the options displayed (e.g., "Extremely Poorly," "Poorly," "Somewhat Poorly," "About Average," "Moderately Well," "Well," and "Extremely Well.") Each question is scored on a seven-point scale (−3 to +3) where a score of −3 is "Extremely Poorly" and +3 is "Extremely Well."

Computation of Personal Style

Figure 6:
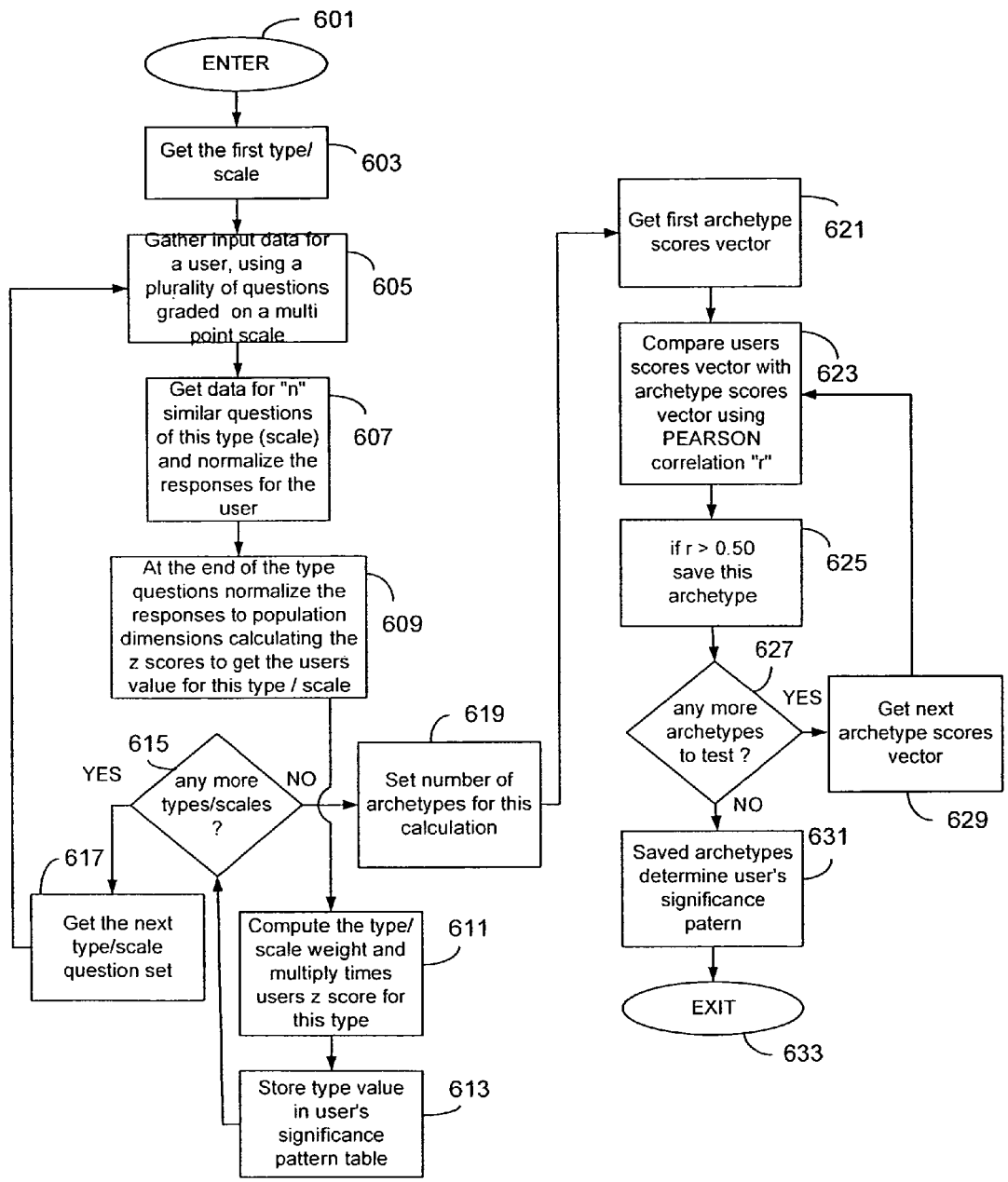
FIG. 6 illustrates functional block diagrams describing an exemplary set of steps to determine a user's personal significance pattern.

In a preferred embodiment, an exemplary description of the method of computing the user significance pattern is now described in more detail with respect to FIG. 6. The basic computational steps include Gather data on a quantitative scale e.g. collect responses to a questionnaire on a 7-point scale as generally described above (see FIG. 4 for an exemplary question display). 605, 607.

Normalize responses in individual dimension (correcting responses for personal mean and expressing as standard deviations). 607

Further normalize responses in population dimension (correcting for population mean and expressing as standard deviations). These values are referred to as "double-normalized data". 609

Compute aggregate scores for underlying scales based on a score table wherein the response to each question is assigned a weight (positive or negative) for each scale. Multiply weights by double-normalized data and add the results to get the user's aggregate score under each scale. 611

Nine scales (also known as "indexes") are currently used: 615, 617

| | |
|---|---|
| OJ = | Open-ended/Judgmental |
| RS = | Risk-Taking/Security-Conscious |
| FU = | Focused/Unfocused |
| CB = | Concrete/Abstract |
| TP = | Territorial/Pacifist |
| EM = | Empiric/Mythic |
| AG = | Anomic/Gregarious |
| IX = | Internal/External Locus of Control |
| DH = | Deceptive/Honest |

Two additional scales are derived from the mean response (SI) and standard deviation of response (DW) for each user.

Scores under each scale are further normalized for the population mean and standard deviation for that scale. Scores are therefore expressed as standard deviations from the population mean.

Generate archetypes. 619ff An archetype is a set of scores across all eleven scales.

Example of an archetype:
OJ 2.41
RS 2.13
FU 0.65
CB 1.76
TP −1.02
EM −2.37
AG 0.02
IX 0.33
DH 2.45
Si 1.27
DW −3.79

Archetypes are empirically created sets that serve as reference points for the natural clustering of such sets (patterns) in any human population. Traditional statistical tools such as procedure MODECLUS in SAS™ can be used to generate such clusters and arrive at archetypes, or archetypes may be derived empirically, by trial and error.

Individual score sets are compared to each archetype by pairwise Pearson. 623 The number of archetypes used in such an analysis will typically range from about six to about twelve. The exact number is defined by the operational needs of the analysis. For the purposes of this embodiment, the number of archetypes needed for analysis of personal style data is defined as the smallest number of archetypes that can generate Person correlations of at >0.50 to at least one of the archetypes, for at least 95% of the population. 625

The correlations derived to each archetype determine that individual's personal style. Further algorithms relate this style assignment to actual probabilities of behavior or preference, as described hereunder.

Person Correlation Coefficient

The Pearson Correlation indicated above is described in standard statistical textbooks such as those referenced above, but for completeness is described generally as follows.

The correlation between two variables reflects the degree to which the variables are related. The most common measure of correlation is the Pearson Product Moment Correlation (called Pearson's correlation for short). When measured in a population the Pearson Product Moment correlation is designated by the Greek letter rho (φ). When computed in a sample, it is designated by the letter "r" and is sometimes called "Pearson's r." Pearson's correlation reflects the degree of linear relationship between two variables. It ranges from +1 to −1. A correlation of +1 means that there is a perfect positive linear relationship between variables. A correlation of −1 means that there is a perfect negative linear relationship between variables. It would be a negative relationship because high scores on the X-axis would be associated with low scores on the Y-axis. A correlation of 0 means there is no linear relationship between the two variables.

The formula for Pearson's correlation takes on many forms. A commonly used formula is shown below. The formula looks a bit complicated, but taken step by step as shown in the numerical example below, it is really quite simple.

$$r = \frac{\Sigma XY - \frac{\Sigma X \Sigma Y}{N}}{\sqrt{\left(\Sigma X^2 - \frac{(\Sigma X)^2}{N}\right)\left(\Sigma Y^2 - \frac{(\Sigma Y)^2}{N}\right)}}$$

A numerical example is as follows:
X Y
1 2
2 5
3 6

$$r = \frac{\Sigma XY - \frac{\Sigma X \Sigma Y}{N}}{\sqrt{\left(\Sigma X^2 - \frac{(\Sigma X)^2}{N}\right)\left(\Sigma Y^2 - \frac{(\Sigma Y)^2}{N}\right)}}$$

$\Sigma XY = (1)(2) + (2)(5) + (3)(6) = 30$ $\Sigma X = 1 + 2 + 3 = 6$ $\Sigma X^2 = 1^2 + 2^2 + 3^2 = 14$ $\Sigma Y = 2 + 5 + 6 = 13$ $\Sigma Y^2 = 2^2 + 5^2 + 6^2 = 65$ $N = 3$ $\Sigma XY - \Sigma X \Sigma Y / N = 30 - (6)(13)/3 = 4$ $\Sigma X^2 - (\Sigma X)^2 / N = 14 - 6^2/3 = 2$ $r = 4/\sqrt{(2)(8.6667)} = 4/4.16333$ $\Sigma Y^2 - (\Sigma Y)^2 / N = 65 - 13^2/3 = 8.667 = .9608$ This value, 0.9608, would say that the numbers in the X column are highly correlated with the numbers in the Y column (a value of +1.0 meaning the numbers were perfectly correlated).

In our example here, if the X column numbers ware derived from a user's inputted answers to three types of questions, and the Y column were numbers associated with a specific archetype, then this high correlation (0.9608) would characterize this user as highly likely to have characteristics of this archetype.

Calculating Z Scores

A simpler looking formula can be used if the numbers are converted into z scores:

where $z_x$ is the variable X converted into z scores and $z_y$ is the variable $$r = \frac{\Sigma z_x z_y}{N}$$

Y converted into z scores.

z scores can be computed as follows:

The standard normal distribution is a normal distribution with a mean of 0 and a standard deviation of 1. Normal distributions can be transformed to standard normal distributions by the formula:

$$z=(X-\mu)/\sigma$$

where X is a score from the original normal distribution, µ is the mean of the original normal distribution, and σ is the standard deviation of original normal distribution. The standard normal distribution is sometimes called the z distribution. A z score always reflects the number of standard deviations above or below the mean a particular score is. For instance, if a person scored a 70 on a test with a mean of 50 and a standard deviation of 10, then they scored 2 standard deviations above the mean. Converting the test scores to z scores, an X of 70 would be:

$$z=(70-50)/10=2$$

So, a z score of 2 means the original score was 2 standard deviations above the mean. Note that the z distribution will only be a normal distribution if the original distribution (X) is normal.

The following example illustrates the collection and analysis of PTT data from a large human sample, and how correlations were successfully made between archetypes and individual preferences for outdoor activities.

Data were collected anonymously from a cohort of 1373 adults (69% female) using two types of online survey questionnaires for each individual. Psychometric data were collected from a timed-response questionnaire, with responses to fifty statements collected on a seven-point scale (Strongly Disagree, Disagree, Somewhat Disagree, Neutral, Somewhat Agree, Agree, Strongly Agree). These statements were selected out of an original inventory of 83 statements, based on a series of beta-tests designed to validate items in the inventory through factor analysis and other conventional methods. The original inventory was compiled from statements adapted from previously validated, public domain, personality test questionnaires (Robinson, et al, 1991). Based on previous work in these areas by other investigators, statements were designed to elicit responses related to novelty-seeking, risk-taking, ability to focus, abstractive thinking, competitiveness, empiricism, social status-seeking, independence, extraversion, response bias and decisiveness. Initial scoring matrices were compiled and refined as follows:

(a) raw answers (−3 to +3) were normalized for the user's own mean and SD from mean. The validity of this correction factor was confirmed by asking the same respondents to answer an unrelated set of 50 statements. The means and SDs correlated better than 0.97 for all users, when compared pairwise.

(b) answers were further normalized for each question, using the population mean and SD for that question.

(c) normalized answers were used to compute aggregate scores for each trait based on the initial scoring matrix. The final scores were compared by pairwise correlation to the normalized answers for each question. The resulting values were then used to adjust the scoring matrix so that those responses to questions that correlated most strongly to the construct being scored, counted proportionately more for that construct.

(d) the process of adjusting the scoring matrix was performed iteratively 4-7 times until successive iterations agreed to within one percent.

Figure 7:
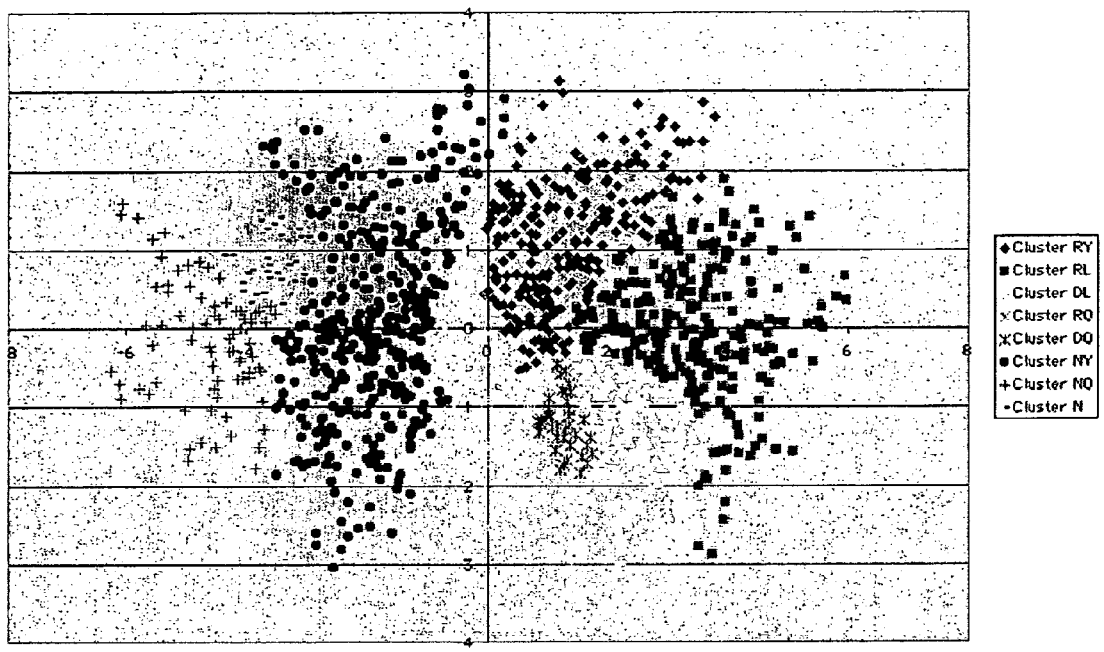
FIG. 7 illustrates a plot describing the clustering of cognitive types.

Referring to FIG. 7, clustering of respondents was accomplished in two steps:

First, the trait scores of 1373 participants were analyzed using standard Principal Component Analysis (SAS Proc PRINCOMP). The technique reduced the true dimensionality of the data space to three or four dimensions (Scree plot analysis), with over 80% of the variance in the data being accounted for in the first two Principal Components. The first Principal Component consisted mainly of measures that describe novelty-seeking while the second was composed of those that describe competitiveness. The data were then clustered hierarchically using SAS procedure MODECLUS.

Eight clusters which together account for 94.3% of the population (these were the only clusters containing at least 2% of the population of 1373 individuals) were identified in the data. A plot of these eight clusters using the two largest Principal Components, which together account for over 80% of the variability in the population, is shown above.

In order to lay the foundation for the identification of archetypes, for each of these clusters the average scores were calculated for all eleven trait variables. By simple pairwise correlation, any individual's 11-score set can be compared to each archetype. By this method, it was possible to assign most of the individuals in the population to archetypes based on Pearson correlation values >0.6 to at least one archetype. However, the assignment could be made substantially more discriminating by making small heuristic adjustments to the archetypes. We are now investigating why these adjustments were effective, in order to derive a formal method for making such adjustments in the future.

TABLE III

Chi-Square Test of Personality Clusters Versus Recreational Activities*

| Recreational Activity | p |
| --- | --- |
| Outdoor Activities | 0.063 |
| Sports | 0.001** |
| Books & Music | 0.045** |
| Surfing The Net | 0.087 |
| Social Activities | 0.110 |
| Movies & TV | 0.243 |
| Creative Activities | 0.018** |

*n = 1039; DF = 63
**significant

In order to lay the foundation for predictive algorithms linking clusters to behavior, a chi-square test was used to see if the hobbies and recreational activities enjoyed by these individuals also grouped in these clusters. The null hypothesis is that the frequency of people enjoying a particular form of recreational activity in a given cluster is similar to that observed in the population as a whole. Our initial results (Table II) show, for example, that in almost every recreational activity (e.g., outdoor recreation, sports, reading books, social pursuits, etc.) a significant (p<0.05) or marginally significant (p<0.10) discordance of pattern across the clusters was observed. Other, more sophisticated analyses, such as canonical correlation more completely describe these kinds of relationships, but these data are not included here, as they are quite extensive. In general, they support a strong connection between cognitive clusters and professional, aesthetic, learning and recreational behaviors.

One skilled in the art will recognize that variations on how the psychological test is presented may be done. For example, instead of a question and answer way of obtaining response from a user, the psychological test may be presented via a game embodiment. In addition, variations of the questions or types of questions may be employed in the invention.

Figure 5:
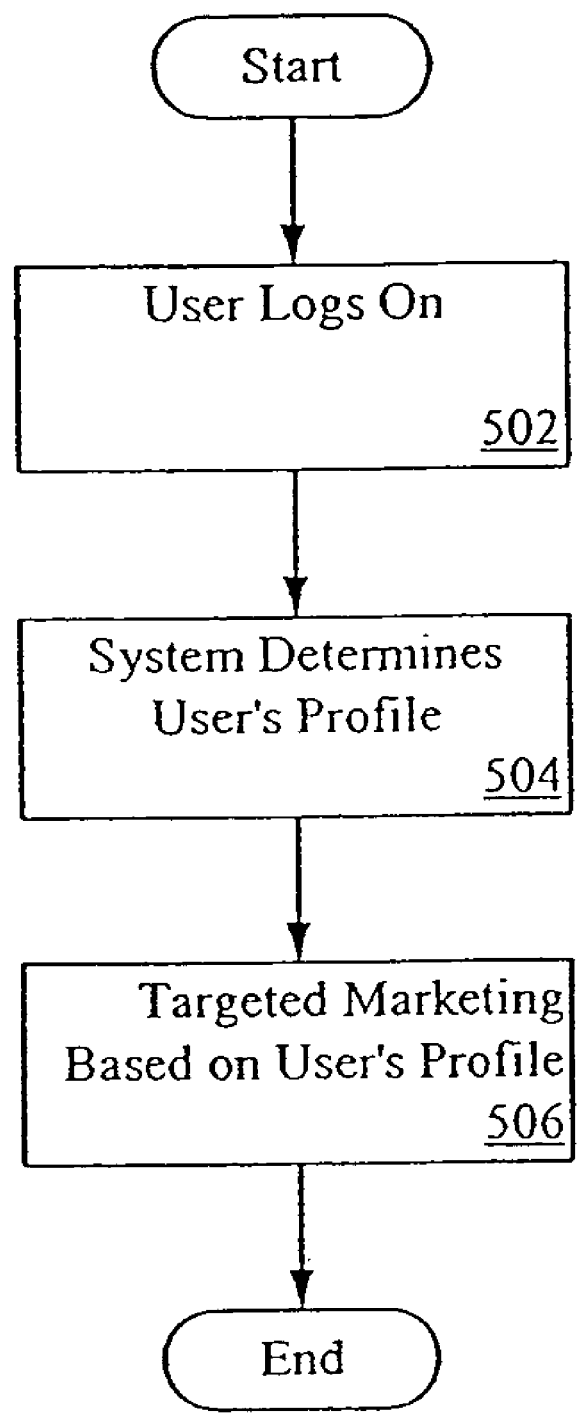
FIG. 5 illustrates a high-level block diagram showing targeted marketing based on the user's classification profile.
Figure 8:
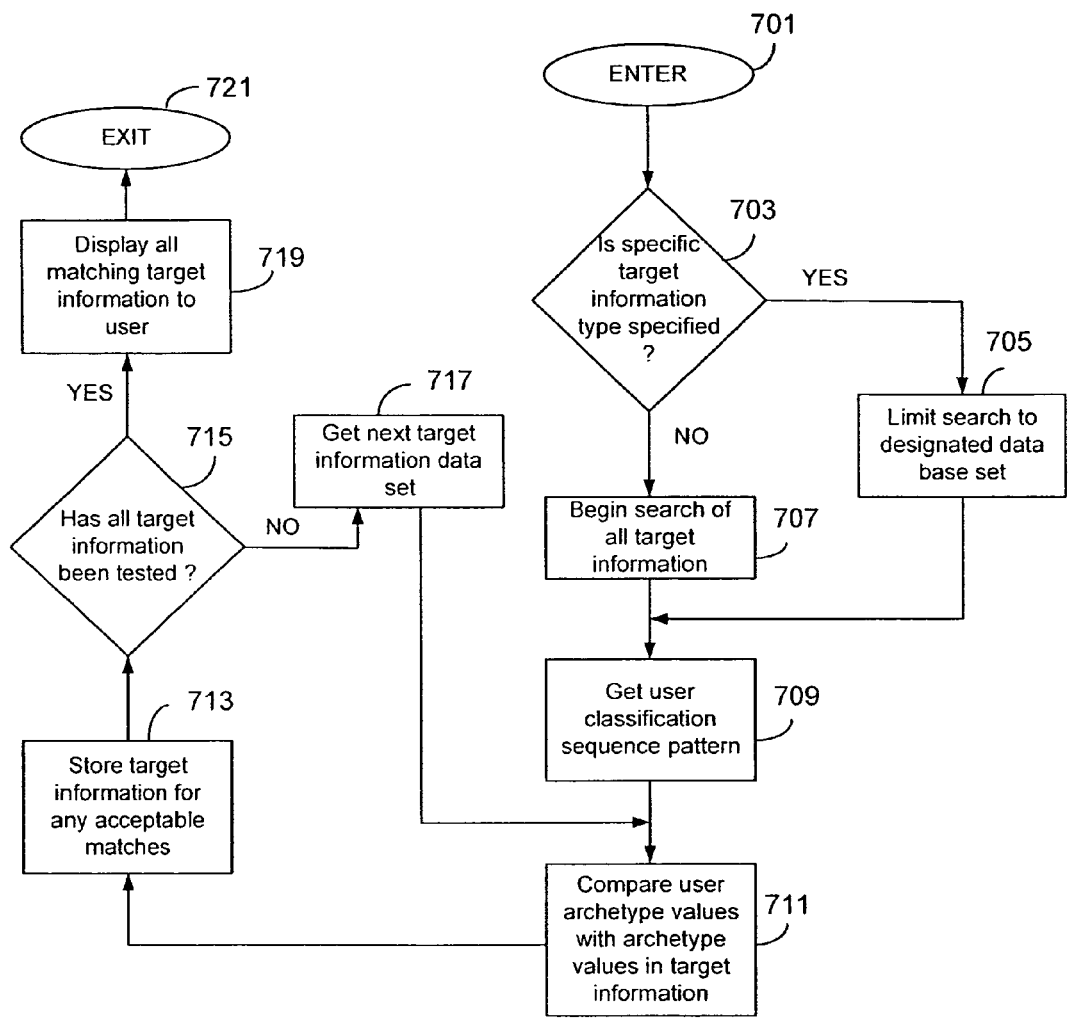
FIG. 8 illustrates a functional block diagram describing an exemplary set of steps in matching the user's significance pattern to target information.

FIG. 5 illustrates a high-level block diagram showing targeted marketing based on the user's significance pattern. In the first step, as shown in 502, the user logs onto the system by accessing the Website and entering the correct user name and password. Once the user logs on, the system retrieves the user's significance pattern, e.g., the mnemonic code "MAU9R." One skilled in the art will recognize that other information about the user may also be retrieved from the corresponding database. After the system retrieves the significance pattern, the system may target the user at step 506, e.g., by showing ads on the Web page that would likely interest the user. This may be implemented by having the system show only search results that matches the user's archetype and characteristics, such as retrieving products which are classified for ARTISTS (i.e., contain a "yes" on the artist field). A generalized exemplary flow diagram of the matching of target information to the user's classification significance pattern is shown in FIG. 8.

One skilled in the art will recognize that other uses of the user's significance pattern may be employed. For example, a chat room categorized by archetype may be created thus enabling users of similar personality to chat with each other.

In another embodiment, the eSAIL system (the Mayflower online Survey of Adaptability, Individualism and Leadership; eSAIL) measures human adaptability and entrepreneurial traits. The following example illustrates the collection and alternative analysis of data from additional human cohorts, and how correlations are successfully made between scale scores and individual preferences. Such personality traits might be expected to influence the dynamics of healthcare dissemination (especially at the point of care), business enterprise at every level (especially at the startup stage), and concepts of personal wellness and lifestyle (in the broadest sense).

The eSAIL system of classification develops and validates a novel online questionnaire designed to measure adaptive entrepreneurial ability, and uses it to elucidate personality-influenced dynamics of healthcare dissemination, business enterprise and concepts of personal wellness. Eleven psychometric base indexes or scales (4 behavior-related, 7 cognitive-affect-related) and one composite scale are derived from a single 43-item online questionnaire (eSAIL) administered to three alphabetical ("patient") cohorts comprised of 1459 individuals, one test-retest cohort (a subset of the original patient cohorts tested six months later), and a cohort of 208 physicians. Four additional cohorts comprising 466 physicians with an interest in cardiometabolic disease and 130 rheumatologists are surveyed for the impact of accredited medical education (CME) on Level 3 educational outcomes and Level 4 adoption of new treatment practices. Satisfactory Cronbach alpha and test-retest reliability coefficients were observed for all primary psychometric scales and the Mayflower composite scale. Discriminant, convergent and predictive validities of eSAIL scales were consistent across cohorts. The relatedness pattern between scales was conserved across cohorts for both behavior-related and cognition/affect-related scale groupings, and suggested a similar branching between maladaptive and adaptive traits in both groupings. Adaptive cognitive and affect scale scores such as 'abstract strategic', and 'positive outlook' correlated significantly (p<0.001) with Mayflower scores. Self-reported stress was inversely related to Mayflower score (p<0.001). Decision and control-related choices of patients (including their preferred form of leadership style) correlated with Mayflower score, suggesting a possible connection to the individual patient's desire to make informed decisions about their own care. Efficacy-conscious physicians scored higher on the eSAIL than safety-conscious physicians (p<0.05). Efficacy-conscious physicians were more likely to adopt new drugs early (p<0.05) but this effect was dependent on exposure to relevant medical education. The potential implication of these findings to the dissemination of new healthcare practices in general, and to transactions between doctor and patient at the point of care in particular, are discussed below.

The Mayflower eSAIL is a reliable and valid instrument for identifying individuals who are more open on average to the adoption of new ideas and behavior in healthcare. This scale may also find utility in other fields such as business and personal wellness. For the purposes of this example, the terms "Mayflower Scale", "Mayflower eSAIL", "Mayflower Index", "Mayflower Classification", "Mayflower Profile", "Mayflower Score" may be used interchangeably.

Cognitive style describes the way each individual thinks about or approaches information in order to solve problems. The adaptability of the human species has been cited a primary reason for its success in exploiting its environment but a reliable online instrument for the rapid measurement of human adaptability and entrepreneurial ability has not been developed. Some popular instruments for measuring cognitive style are the NEO-PI, NEO-FFI, the Myers-Briggs Type Indicator (MBTI), the Keirsey Temperament Sorter, and the Enneagram. There have been criticisms raised by the scientific community about the construct validity or low test-retest reliability of some of the scales associated with these instruments. In addition, many of these instruments are long (>30 min) and are offered as paper-and-pencil tests. The eSAIL is a rapid (<10 min) 43-item online questionnaire that attempts to classify an individuals' inherent style based on adaptability. We developed eleven psychometric scales (plus an additional scale based on response characteristics) and used these to derive a composite scale (the Mayflower scale) that purports to measure an individual's adaptive and entrepreneurial abilities. The Mayflower scale was developed in order to gain insights into processes such as personality-related dynamics in healthcare dissemination, business entrepreneurship and personal wellness. In this example we focus on how physician and patient characteristics might determine adoption of new healthcare practices.

The eSAIL is a 43-item online questionnaire designed to assess adaptive style. The questions are served individually and responses are timed in milliseconds. Each item on the eSAIL is answered on a seven-point scale. The score for each item ranges from −3 (strongly disagree) to 3 (strongly agree) with 0 being neutral. The scales derived from this instrument are summarized in Table 2. An example of an item is "I will often try something impulsively, just to see what happens." The eSAIL typically takes less than 10 minutes to complete.

The eSAIL was validated and its utility demonstrated using cohorts of patients and physicians. The cohorts are listed in Table IV.

TABLE IV

Online Study Cohorts.

| Cohort | Respondents (n) | Percent Female | Description | Source | Comments |
|---|---|---|---|---|---|
| A | 486 | 55.8 | Random (Patient) | Family Web Site Ad | |
| B | 486 | 63.2 | Random (Patient) | Family Web Site Ad | |
| C | 487 | 63.7 | Random (Patient) | Family Web Site Ad | |
| D | 258 | 65.5 | Random (Patient) | | Cohorts A, B, C Re-Invited |

TABLE IV-continued

Online Study Cohorts.

| Cohort | Respondents (n) | Percent Female | Description | Source | Comments |
|---|---|---|---|---|---|
| E | 208 | 49.5 | Physician | BioCritique Email List | All Specialties |
| F | 169 | ND | Physician | BioCritique Email List* | Cardiometabolic** |
| G | 79 | ND | Physician | BioCritique Email List* | Rheumatology |
| H | 297 | ND | Physician | eDoctorNet Opt-In List* | Cardiometabolic |
| I | 51 | ND | Physician | eDoctorNet Opt-In List* | Rheumatology |

*Anonymous survey participants received $20 Amazon Gift Certificate;
**Cardiometabolic specialties (cardiology, endocrinology, nephrology) and primary care/internal medicine practitioners with an interest in cardiometabolic disease.;
NA = not determined.

Table V lists the features of the scales validated using these cohorts.

TABLE V

Characteristics of new scales used in this study.

| Scale Name | Acronym | cohort # Items | Cronbach's Alpha Coefficient | | | | | 6-Month Test-Retest Reliability |
|---|---|---|---|---|---|---|---|---|
| | | | A | B | C | D | E | D vs A-B-C |
| Individualist | BOLD | 5 | 0.594 | 0.572 | 0.620 | | | 0.833 |
| Reconstructive | RESTRUCT | 4 | 0.555 | 0.569 | 0.564 | | | 0.592 |
| Impromptu | IMPROMPTU | 6 | 0.490 | 0.574 | 0.562 | | | 0.759 |
| Cynical | MACH | 3 | 0.621 | 0.653 | 0.571 | | | 0.687 |
| Response Bias* | RESPBIAS | | | | | | | 0.796 |
| Stressed | STRESSED | 4 | 0.675 | 0.670 | 0.603 | | | 0.748 |
| Dogmatic | DOGMATIC | 5 | 0.594 | 0.572 | 0.620 | | | 0.814 |
| Abstract Strategic | ABSTRACT | 5 | 0.381 | 0.443 | 0.532 | | | 0.767 |
| Positive Outlook | POSITIVE | 3 | | | | 0.878 | 0.856 | |
| Empathy | EMPATHY | 3 | | | | 0.744 | 0.749 | |
| Dissociation | DISSOC | 2 | | | | 0.706 | 0.771 | |
| Absent-Mindedness | SPACEY | 3 | | | | 0.586 | 0.615 | |
| Adaptivity | MAYFLOWER | ** | | 0.587 | | 0.646 | 0.657 | 0.808 |

Figure 9:
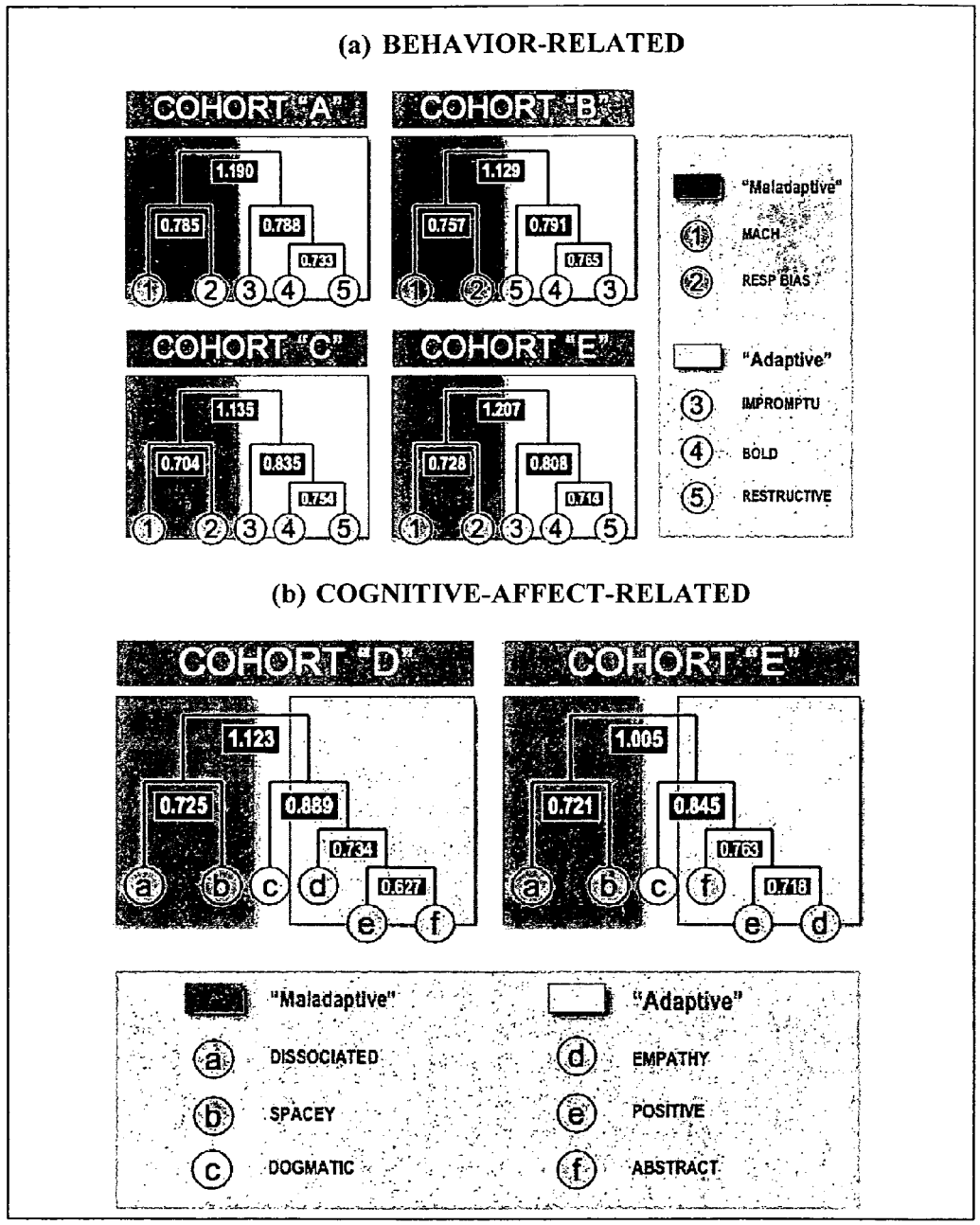
FIG. 9 illustrates a diagram describing the relatedness of scales that are well conserved across cohorts.

*mean response to all questions, expressed as a z score.
**Composite of BOLD, RESTRUCT, MACH, RESPBIAS scales The relatedness of these scales is well conserved across cohorts, as shown in FIG. 9. In FIG. 9, dendograms were constructed from cohort scores for behavior-related (a) and cognitive-affect-related (b) scales. Cohort D was omitted from the top panel because it is a retest of individuals from cohorts A-B-C. Branch length values (arbitrary) are in black squares. Maladaptive traits map to the left segment (dark shaded) and adaptive traits map to the right (light shaded).

In order to characterize the features of eSAIL Mayflower segments, each cohort population was divided into four quartiles by their Mayflower score. Statistically significant demographic, cognitive and affect-related co-variates were observed (Tables VI and VII).

TABLE VI

Demographic characteristics of Mayflower quartiles. Cohorts are segmented into quartiles by Mayflower adaptivity score. Features of each quartile are shown.

| | | Mean (±SD) | | | |
|---|---|---|---|---|---|
| ITEM | COHORT | Entire Cohort | Mayflower Quartile 1 (Low) | Mayflower Quartile 4 (High) | p value (Q1 vs Q4) |
| Age (years) | A | 50.6 ± 12.0 | 49.2 ± 12.7 | 52.0 ± 11.5 | 0.0757 |
| | B | 50.2 ± 12.7 | 50.7 ± 13.6 | 49.1 ± 13.1 | 0.3591 |
| | C | 50.6 ± 12.1 | 49.6 ± 12.5 | 50.9 ± 11.9 | 0.3865 |
| | D | 49.9 ± 12.8 | 50.2 ± 15.1 | 49.3 ± 10.8 | 0.7046 |
| | E | 47.4 ± 13.2 | 49.3 ± 14.0 | 45.9 ± 12.6 | 0.2025 |

TABLE VI-continued

Demographic characteristics of Mayflower quartiles. Cohorts are segmented into quartiles by Mayflower adaptivity score. Features of each quartile are shown.

| | | Mean (±SD) | | | |
| --- | --- | --- | --- | --- | --- |
| ITEM | COHORT | Entire Cohort | Mayflower Quartile 1 (Low) | Mayflower Quartile 4 (High) | p value (Q1 vs Q4) |
| College (years) | A | 3.67 ± 2.70 | 2.36 ± 2.57 | 4.44 ± 2.47 | <0.0001 |
| | B | 3.89 ± 2.65 | 3.34 ± 2.55 | 4.41 ± 2.63 | 0.0014 |
| | C | 3.50 ± 2.58 | 3.04 ± 2.72 | 4.20 ± 2.43 | 0.0006 |
| Household Income ($) | A | 61929 ± 33657 | 50696 ± 30960 | 67543 ± 35133 | 0.0001 |
| | B | 62952 ± 34736 | 52283 ± 31544 | 68488 ± 36761 | 0.0003 |
| | C | 63110 ± 35794 | 50978 ± 31420 | 75088 ± 38331 | <0.0001 |
| Total Number of Countries Visited | A | 4.87 ± 9.09 | 3.19 ± 5.14 | 6.55 ± 14.30 | 0.0163 |
| | B | 4.67 ± 6.85 | 3.57 ± 4.87 | 5.66 ± 7.97 | 0.0143 |
| | C | 4.70 ± 7.24 | 2.33 ± 3.28 | 6.30 ± 7.18 | <0.0001 |

TABLE VII eSAIL scores of cohorts segmented by Mayflower adaptivity. Normalized z scores (deviations from mean) are shown.

| | | Mean (±SD) | | | |
| --- | --- | --- | --- | --- | --- |
| SCALE | COHORT | Entire Cohort | Mayflower Q 1 (Low) | Mayflower Q 4 (High) | p value (Q1 vs Q4) |
| MAYFLOWER | A | 0.056 ± 0.994 | −1.263 ± 0.581 | 1.259 ± 0.386 | <0.0001 |
| | B | 0.042 ± 1.023 | −1.284 ± 0.495 | 1.328 ± 0.411 | <0.0001 |
| | C | −0.094 ± 0.990 | −1.386 ± 0.543 | 1.127 ± 0.434 | <0.0001 |
| | D | 0.001 ± 1.014 | −1.294 ± 0.510 | 1.293 ± 0.390 | <0.0001 |
| | E | 0.001 ± 1.020 | −1.365 ± 0.564 | 1.222 ± 0.376 | <0.0001 |
| STRESSED | A | −0.043 ± 1.011 | 0.483 ± 0.950 | −0.476 ± 0.854 | <0.0001 |
| | B | −0.049 ± 1.011 | 0.360 ± 0.978 | −0.474 ± 0.803 | <0.0001 |
| | C | 0.093 ± 0.972 | 0.612 ± 0.898 | −0.324 ± 0.803 | <0.0001 |
| | D | 0.000 ± 1.000 | 0.620 ± 0.854 | −0.676 ± 0.728 | <0.0001 |
| | E | 0.000 ± 0.954 | 0.537 ± 0.930 | −0.372 ± 0.829 | <0.0001 |
| IMPROMPTU | A | 0.009 ± 0.928 | −0.265 ± 0.919 | 0.317 ± 0.963 | <0.0001 |
| | B | −0.021 ± 1.016 | −0.283 ± 0.991 | 0.230 ± 0.920 | <0.0001 |
| | C | 0.011 ± 1.053 | −0.147 ± 1.130 | 0.266 ± 1.124 | <0.0001 |
| | D | 0.000 ± 1.000 | −0.444 ± 0.952 | 0.225 ± 0.997 | 0.0002 |
| | E | 0.000 ± 1.002 | −0.355 ± 0.976 | 0.127 ± 0.928 | 0.0112 |
| DOGMATIC | A | −0.037 ± 0.984 | −0.119 ± 0.990 | 0.173 ± 0.900 | 0.0217 |
| | B | 0.011 ± 1.014 | −0.083 ± 1.031 | 0.154 ± 0.861 | 0.0546 |
| | C | 0.025 ± 1.003 | −0.043 ± 1.037 | 0.072 ± 0.932 | 0.3752 |
| | D | 0.000 ± 1.000 | −0.201 ± 1.175 | 0.401 ± 1.022 | 0.0024 |
| | E | 0.000 ± 0.967 | −0.019 ± 1.124 | 0.043 ± 0.778 | 0.7423 |
| ABSTRACT | A | 0.092 ± 0.938 | −0.211 ± 1.06 | 0.207 ± 0.772 | 0.0004 |
| | B | 0.004 ± 0.977 | −0.318 ± 1.135 | 0.313 ± 0.776 | <0.0001 |
| | C | −0.096 ± 1.073 | −0.500 ± 1.264 | 0.074 ± 0.898 | <0.0001 |
| | D | 0.000 ± 1.000 | −0.496 ± 1.280 | 0.271 ± 0.674 | <0.0001 |
| | E | 0.000 ± 0.864 | −0.163 ± 0.956 | 0.106 ± 0.724 | 0.1089 |
| POSITIVE | D | 0.000 ± 1.000 | −0.606 ± 1.018 | 0.554 ± 0.655 | <0.0001 |
| | E | 0.000 ± 0.990 | −0.593 ± 1.097 | 0.403 ± 0.706 | <0.0001 |
| EMPATHY | D | 0.000 ± 1.000 | −0.476 ± 1.125 | 0.302 ± 0.959 | <0.0001 |
| | E | 0.000 ± 1.003 | −0.622 ± 1.133 | 0.529 ± 0.613 | <0.0001 |
| SPACEY | D | 0.000 ± 1.000 | 0.296 ± 0.997 | −0.303 ± 0.806 | 0.0005 |
| | E | 0.000 ± 1.007 | 0.336 ± 1.045 | −0.125 ± 0.926 | 0.0191 |
| DISSOCIATED | D | 0.000 ± 1.000 | 0.131 ± 1.178 | −0.015 ± 0.804 | 0.4148 |
| | E | 0.000 ± 1.022 | 0.235 ± 1.301 | −0.065 ± 0.614 | 0.1377 |

Figure 10:
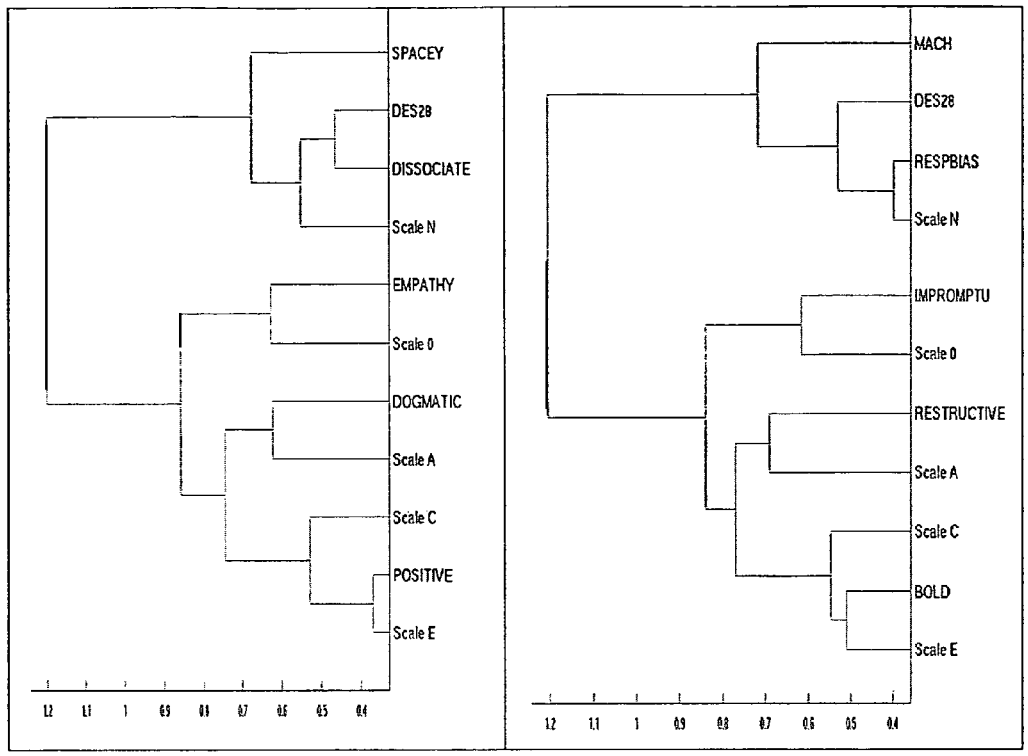
FIG. 10 illustrates a diagram describing the convergent and discriminant validity of the eSAIL scale.

In order to establish convergent validity and discriminant validity of the eSAIL scales, participants in cohort D were also asked to take the NEO-FFI personality test and the DES-28 dissociation scale. FIG. 10 shows dendograms of relatedness between these scales and eSAIL scales (the convergent and discriminant validity of eSAIL scales). Cohort D (n=258) completed the NEO-FFI and DES28 questionnaires, in addition to the eSAIL. Data from these responses were used to construct dendograms of relatedness between the five NEO-FFI scales (N, E, O, A, C), DES-28 and eSAIL scales (Panels A & B, cognitive-affect group and behavioral group respectively). Panel C shows mean scores in these reference scales by individuals of cohort D segmented by Mayflower score quartile.

The doctor-patient interface was explored using surveys of the physician cohorts (Table VIII). Answers to selected questions are listed in Table VIII. The identification of "information-aggressive" patients suggests a method of cohort segmentation (classification) for better program and content targeting.

TABLE VIII

Doctor-Patient Communication Dynamics. Four cohorts of physicians (F, G, H, I) were asked questions about information and communication needs in their practice.

(A) "Please list what you consider to be the top three medical information gaps that need to be addressed in order to improve patient care." [Open-Ended Response]. The percentage of physicians citing each of the top two most-often mentioned gaps is shown.

| % Citing Information Gap | Coh F | Coh G | Coh H | Coh I | Mean |
|---|---|---|---|---|---|
| Patient Education | 51.6 | 52.4 | 56.1 | 50.1 | 52.6 |
| Third Party Payor Education | 29.3 | 36.1 | 42.7 | 39.6 | 36.9 |

(B) "Do you think that satisfactorily managing patients' questions about new treatment interventions and/or drugs constitutes a growing gap in patient care?" [Forced Choice]

| % Responding | Coh F | Coh G | Coh H | Coh I | Mean |
|---|---|---|---|---|---|
| Yes | 72.1 | 73.4 | 70.7 | 72.9 | 72.3 |
| No | 27.9 | 26.6 | 29.3 | 27.1 | 27.7 |

(C) Physicians were asked about the average time spent per visit with "information-aggressive" patients (defined as patients who 'take up an inordinate amount of time with questions about disease/treatment options') [Open-Ended]

|  | Coh F | Coh G | Coh H | Coh I | Mean |
|---|---|---|---|---|---|
| Average Time Spent (mins) |  |  |  |  |  |
| Information-Aggressive Patients | 25.2 | 25.8 | 28.0 | 25.9 | 26.2** |
| All Patients | 18.3 | 17.9 | 17.6 | 17.5 | 17.8 |
| % of All Patients In Practice |  |  |  |  |  |
| Information-Aggressive | 7.46 | 6.20 | 6.75 | 7.43 | 6.96 |

* $p < 0.01$ (D) Physicians (Cohort E) and patients (Cohort D) were asked about their preference of team leadership style [Forced Choice]. The percent cohort selecting each choice is shown segmented by Mayflower score.

| Preferred Leadership Style | Cohort | Mayflower Q1 | Mayflower Q4 | p value (Q1 vs Q4) |
|---|---|---|---|---|
| The leader gives me clear instructions so I understand what to do | Physicians | 25.0 | 44.2 | 0.0397 |
|  | Patients | 12.5 | 36.9 | 0.0012 |
| The leader lets us talk things out and come up with a consensus | Physicians | 44.2 | 44.2 | NS |
|  | Patients | 45.3 | 46.2 | NS |
| I'm the leader | Physicians | 30.8 | 11.5 | 0.0164 |
|  | Patients | 42.2 | 16.9 | 0.0015 |

In order to develop a simple, functional segmentation of the physician population based on their adaptive style, physicians were asked their opinion on whether decisions about adopting new drugs should be based primarily on efficacy or on efficacy (forced-choice). The two resulting segments had significantly different Mayflower scores (Table IX).

TABLE IX

Efficacy-focused versus safety-focused physicians.

(A) Physician focus reveals their adaptivity.
In a forced-choice question, 208 physicians who had taken the eSAS (cohort E) were asked: "When evaluating a new drug, should health professionals focus mainly on efficacy (is it the most effective treatment option?) or safety (is there enough evidence that it is safe?)"
Average eSAS scale scores for efficacy- and safety-focused physician respondents are shown.

| Scale | Efficacy-focused (n = 116) Mean ± SD | Safety-Focused (n = 81) Mean ± SD | p value |
|---|---|---|---|
| Mayflower (Adaptivity) | 0.170 ± 0.909 | −0.234 ± 1.165 | 0.0099 |
| Stressed | −0.117 ± 0.959 | 0.145 ± 0.925 | 0.0574 |
| Absent-Minded | −0.138 ± 0.958 | 0.129 ± 1.039 | 0.0692 |
| Empathetic | 0.110 ± 0.994 | −0.149 ± 1.029 | 0.0805 |
| Positive Outlook | 0.085 ± 0.893 | −0.107 ± 1.099 | 0.1960 |
| Age (years) | 48.4 ± 13.5 | 46.3 ± 12.7 | 0.2583 |

(B) Safety-focused physicians are disproportionately stressed by the prospect of adopting a new drug.
A total of 596 physicians (cohorts F, G, H and I) were asked the question: "In my work I feel stressed by the prospect of . . . " and given several response options. In each case, stress was reported on a 0–4 scale (4 = more stress). Mean values are shown.

| Response Option | Sg* | Cohort F | Cohort H | Cohort G | Cohort I |
|---|---|---|---|---|---|
| . . . running my practice as a successful business. | All | 1.442 | 1.491 | 1.613 | 1.333 |
|  | Eff | 1.408 | 1.456 | 1.757 | 1.500 |
|  | Saf | 1.508 | 1.486 | 1.258 | 1.050 |
| . . . answering endless questions from 'Google-happy' patients. | All | 1.032 | 1.150 | 1.133 | 1.292 |
|  | Eff | 1.042 | 1.013 | 1.216 | 1.364 |
|  | Saf | 1.172 | 1.134 | 1.000 | 1.150 |
| . . . trying out a new drug on a patient. | All | 0.740 | 0.749 | 0.707 | 0.708 |
|  | Eff | 0.592 | 0.594 | 0.541 | 0.591 |
|  | Saf | 0.861** | 0.894** | 0.871 | 0.800 |

TABLE IX-continued

Efficacy-focused versus safety-focused physicians.

| | | | | | |
|---|---|---|---|---|---|
| . . . finding credible sources of medical opinion online. | All | 0.708 | 0.655 | 0.840 | 0.604 |
| | Eff | 0.648 | 0.539 | 0.919 | 0.591 |
| | Saf | 0.722 | 0.768 | 0.677 | 0.500 |

*Segments based on efficacy or safety focus (approx. 50% each);
**$p < 0.02$

These data demonstrate that efficacy-focus versus safety-focus can be used a rapid way to differentiate a cohort according to their adaptive style (Mayflower). The use of this method for the cognitive or psychological segmentation of healthcare professionals has not been previously described.

The impact of accredited medical education (CME) on physician behavior has not been carefully and quantitatively related to psychological, adaptive or cognitive style. Using the Mayflower-related segmentation system described above (efficacy versus safety focus) it is possible to track the segments of a physician population that best respond to CME with Level 3 (learning) and Level 4 (behavioral) outcomes (Table X).

TABLE X

After attending relevant CME, efficacy-focused physicians adopt drugs more rapidly than safety-focused physicians. Cardiometabolic (cohorts F, H) and Rheumatology Groups (Cohorts G, I) did (F, G) or did not (H, I) attend online CME programs at www.biocritique.com. These programs were designed to target specific areas of learning that related to new drugs. After 12 months, surveys were conducted to establish familiarity with relevant topics ('Level 3' [L3] outcomes; scale 1-5; 5 = very familiar) and prescription of the new drugs to patients ('Level 4' [L4] outcomes; percent of eligible patients treated).

| Item | | Cohort F | Cohort H | Cohort G | Cohort I |
|---|---|---|---|---|---|
| Education Program (BioCritique) | | Yes | No | Yes | No |
| Topic Area* | | CM | CM | RU | RU |
| Age (yrs) | | 47.9 | 46.9 | 48.6 | 47.7 |
| Hours of CME taken per month | | 16.3 | 14.9 | 14.9 | 13.5 |
| Patients treated per month | | 225.7 | 263.2 | 252.2 | 259.9 |
| Scientific papers read per month | | 8.2 | 7.2 | 9.5 | 7.9 |
| Scientific papers published (5 years) | | 4.9 | 4.3 | 3.1 | 4.3 |
| Education Topic (L3) | Segment | | | | |
| CM Drug Class 1 | All Physicians | 3.18 ± 1.13** | 2.81 ± 1.13 | | |
| CM Drug Class 2 | All Physicians | 2.75 ± 1.30** | 2.07 ± 1.14 | | |
| CM Drug Class 3 | All Physicians | 3.47 ± 1.11** | 3.13 ± 0.97 | | |
| CM Control Topic | All Physicians | 1.96 ± 1.02 | 1.90 ± 1.04 | | |
| RU Drug Class 4 | All Physicians | | | 3.17 ± 1.04** | 2.77 ± 1.06 |
| RU Drug Class 5 | All Physicians | | | 3.84 ± 0.85** | 3.44 ± 0.99 |
| RU Control Topic | All Physicians | | | 2.87 ± 0.93 | 2.94 ± 1.02 |
| Prescriptions (L4) | Segment*** | | | | |
| CM Drug 1 | All Physicians | 4.93 ± 12.84** | 3.15 ± 7.32 | | |
| [17 Months | E Physicians | 7.93 ± 17.84** | 3.06 ± 8.65 | | |
| Post-Launch] | S Physicians | 2.61 ± 5.22 | 3.00 ± 5.06 | | |
| CM Drug 2 | All Physicians | 5.45 ± 8.81** | 3.76 ± 7.30 | | |
| [13 Months | E Physicians | 6.96 ± 10.07** | 3.27 ± 5.15 | | |
| Post-Launch] | S Physicians | 4.19 ± 7.61 | 4.12 ± 8.84 | | |
| CM Drug 3A | All Physicians | 11.92 ± 18.94 | 9.01 ± 12.43 | | |
| [21 Months | E Physicians | 16.25 ± 24.80** | 9.89 ± 11.95 | | |
| Post-Launch] | S Physicians | 8.81 ± 11.32 | 8.30 ± 13.25 | | |
| CM Drug 3B | All Physicians | 14.64 ± 16.93** | 19.25 ± 18.65 | | |
| [>150 Months | E Physicians | 19.40 ± 21.42 | 20.10 ± 18.33 | | |
| Post-Launch] | S Physicians | 10.90 ± 10.85** | 17.64 ± 18.28 | | |
| RA Drug 4 | All Physicians | | | 5.29 ± 5.91 | 4.29 ± 5.28 |
| [5 Months | E Physicians | | | 5.84 ± 5.88 | 4.64 ± 5.58 |
| Post-Launch] | S Physicians | | | 4.61 ± 6.17 | 3.50 ± 3.30 |
| RA Drug 5 | All Physicians | | | 13.63 ± 13.94** | 9.35 ± 8.74 |
| [41 Months | E Physicians | | | 14.14 ± 13.79** | 8.23 ± 8.21 |
| Post-Launch] | S Physicians | | | 11.68 ± 13.74 | 10.85 ± 9.72 |

*CM = cardiometabolic; RU = rheumatology;
**$p < 0.05$;
***E-Physicians = efficacy-focused, S-Physicians = safety-focused The example shown above is illustrative of methodologies that use an understanding of adaptive style to better understand and optimize the patient-physician interface in healthcare dissemination. A second approach is outlined here: Humor is known to be cognitive-style specific. Specific archetypes are indicative of the subject's sense of humor. The use of humor (jokes, cartoons) to incentivize individuals to, say, visit a webpage frequently, can be leveraged to bring selected patients to content that encourages compliance (taking the prescribed medication). For example, a weekly email with humorous content can link to a web page with compliance-encouraging content. Additional embodiments of this invention may be based on the user's propensity for participating in contests and games, or the user's propensity for gambling.

Those skilled in the art will recognize that the method and product of the present invention has many industrial applications, particularly in web-enabled e-commerce, and the present invention is not limited to the representative embodiments described herein. All modifications, variations, or equivalent arrangements and implementations that are within the scope of the attached claims should therefore be considered within the scope of the invention.

It should be understood that all of the computers of the systems illustrated in FIG. 1 preferably have a construction similar to that shown in FIG. 2, so that details described with respect to the FIG. 2 computer 200 will be understood to apply to all computers of the systems in FIG. 1. Any of the computers can have an alternative construction, so long as they can support the functionality described herein.

In this document, the terms "computer program product," "computer-readable medium" and the like may be used generally to refer to media such as, for example, database server 160. These and other forms of computer-readable media may be involved in storing one or more sequences of one or more instructions for use by web server 150 or application server 180, to cause the processor to perform specified operations. Such instructions, generally referred to as "computer program code" (which may be grouped in the form of computer programs or other groupings), when executed, enable the computing system to perform features or functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system using, for example, a removable storage drive communications interface 130. The control logic (in this example, software instructions or computer program code), when executed by the web server 150 or application server 180, causes the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

I claim:

1. A computer implemented method for classifying a user to match the user with target information, the method comprising:

creating by a processor an archetypal classification significance pattern for a user using at least one psychological test that measures inherent traits of the user and which is not dependent on the user's past behavior, wherein use of the archetypal classification significance pattern is consensual, the user has control of the archetypal classification significance pattern when the archetypal classification significance pattern is in use, and the archetypal classification significance pattern remains stable over time for the user; and determining by the processor the target information matching one or more elements of the archetypal classification significance pattern for the user, the determining performed using a classification index for the target information.

2. The computer implemented method of claim 1, wherein the psychological test is eSAIL.

3. The computer implemented method of claim 1, wherein the archetypal classification significance pattern includes data indicative of an archetype to which the user corresponds.

4. The computer implemented method of claim 3, wherein the archetype comprises an efficacy-focused archetype.

5. The computer implemented method of claim 3, wherein the archetype comprises a safety-focused archetype.

6. The computer implemented method of claim 3, wherein the archetype is indicative of a sense of humor.

7. The computer implemented method of claim 3, wherein the archetype is indicative of a patient's information-aggressive behavior.

8. The computer implemented method of claim 3, wherein the archetype is indicative of a patient's propensity for participating in contests and games.

9. The computer implemented method of claim 3, wherein the archetype is indicative of a patient's propensity for gambling.

10. The computer implemented method of claim 1, further comprising:

presenting using a display the matched target information to the user.

11. The computer implemented method of claim 10, wherein the target information comprises at least a product or service.

12. A system for matching a user with target information based on classification of the user, comprising:

a computer server node in a network system, the computer server node having a first code mechanism operable to create an archetypal classification significance pattern for a user using a psychological test that measures inherent traits of the user and is not dependent on the user's past behavior, wherein the archetypal classification significance pattern remains stable over time for the user;

a data base coupled to the computer server node and including a classification index for the target information, wherein the classification index is configured for matching to one or more elements of the archetypal classification significance pattern of the user; and a second code mechanism coupled to the first code mechanism and operable to find target information whose classification index matches one or more elements of the archetypal classification significance pattern of the user, wherein use of the archetypal classification significance pattern is consensual and the user has control of the archetypal classification significance pattern when the archetypal classification significance pattern is in use.

13. The system of claim 12, wherein the psychological test is eSAIL.

14. The system of claim 12, wherein the archetypal classification significance pattern includes data indicative of an archetype to which the user corresponds.

15. The system of claim 14, wherein the archetype comprises an efficacy-focused archetype.

16. The system of claim 14, wherein the archetype comprises a safety-focused archetype.

17. The system of claim 14, wherein the archetype is indicative of a sense of humor.

18. The system of claim 14, wherein the archetype is indicative of a patient's information-aggressive behavior.

19. The system of claim 14, wherein the archetype is indicative of a patient's propensity for participating in contests and games.

20. The system of claim 14, wherein the archetype is indicative of a patient's propensity for gambling.

21. A non-transitory computer-readable medium comprising computer-executable instructions for matching a user with target information, the computer-executable instructions executed by a computer for causing performance of the method comprising:

receiving at the computer measures of a user's traits obtained from a psychological test, wherein the psychological test does not measure the user's past behavior;

identifying by the computer one or more archetypes corresponding to the user's traits based on clusters determined from a plurality of measures of users' traits; and determining by the computer an archetypal classification significance pattern for the user to permit matching the user with target information, the matching performed using a classification index for the target information, wherein the archetypal classification significance pattern remains stable over time for the user, and wherein use of the archetypal classification significance pattern is consensual and the user has control of the archetypal classification significance pattern when the archetypal classification significance pattern is in use.

22. The computer-readable medium of claim 21, wherein the psychological test is eSAIL.

23. The computer-readable medium of claim 21, wherein the archetypal classification significance pattern includes data indicative of an archetype to which the user corresponds.

24. The computer-readable medium of claim 23, wherein the archetype comprises an efficacy-focused archetype.

25. The computer-readable medium of claim 23, wherein the archetype comprises a safety-focused archetype.

26. The computer-readable medium of claim 23, wherein the archetype is indicative of a sense of humor.

27. The computer-readable medium of claim 23, wherein the archetype is indicative of a patient's information-aggressive behavior.

28. The computer-readable medium of claim 23, wherein the archetype is indicative of a patient's propensity for participating in contests and games.

29. The computer-readable medium of claim 23, wherein the archetype is indicative of a patient's propensity for gambling.

30. The computer-readable medium of claim 21, for causing further performance of the method comprising:

determining by the computer the target information matching one or more elements of the archetypal classification significance pattern for the user.

* * * * *